(12) United States Patent
Wloczysiak

(10) Patent No.: US 10,707,905 B2
(45) Date of Patent: Jul. 7, 2020

(54) WIDEBAND MULTIPLEXER FOR RADIO-FREQUENCY APPLICATIONS

(71) Applicant: SKYWORKS SOLUTIONS, INC., Woburn, MA (US)

(72) Inventor: Stephane Richard Marie Wloczysiak, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 15/190,463

(22) Filed: Jun. 23, 2016

(65) Prior Publication Data
US 2017/0026061 A1   Jan. 26, 2017

Related U.S. Application Data

(60) Provisional application No. 62/183,608, filed on Jun. 23, 2015.

(51) Int. Cl.
*H04B 1/00* (2006.01)
(52) U.S. Cl.
CPC ................... *H04B 1/0057* (2013.01)
(58) Field of Classification Search
CPC ..................................................... H04B 1/0057
See application file for complete search history.

(56) References Cited

U.S. PATENT DOCUMENTS

| | | | | |
|---|---|---|---|---|
| 7,569,972 B2* | 8/2009 | Nishiyama | ......... | H03H 9/02559 310/313 A |
| 7,696,842 B2* | 4/2010 | Uejima | ..................... | H04B 1/48 333/101 |
| 7,868,517 B2* | 1/2011 | Belot | ....................... | H03H 9/17 310/313 B |
| 7,876,021 B2* | 1/2011 | Kadota | .............. | H03H 9/02559 310/313 B |
| 8,575,818 B2* | 11/2013 | Yamazaki | .......... | H03H 9/02818 310/313 B |
| 8,581,674 B2* | 11/2013 | Tanaka | ................. | H03H 9/0561 333/133 |
| 8,897,407 B2* | 11/2014 | Badke | .................... | H04B 15/00 342/357.59 |
| 9,042,857 B2* | 5/2015 | Vosburgh | ............... | H04B 1/525 327/311 |
| 9,077,311 B2* | 7/2015 | Yan | ..................... | H03H 9/02015 |
| 9,148,123 B2* | 9/2015 | Kawasaki | .............. | H03H 7/075 |
| 9,172,404 B1* | 10/2015 | Iversen | ................ | H04B 1/0082 |
| 9,537,464 B2* | 1/2017 | Yamanaka | ......... | H03H 9/02551 |

(Continued)

*Primary Examiner* — Jenee Holland
(74) *Attorney, Agent, or Firm* — Chang & Hale LLP

(57) ABSTRACT

Wideband multiplexer for radio-frequency (RF) applications. In some embodiments, a multiplexer may include a common path configured to receive a plurality of RF signals. The multiplexer may further include a first path having an output coupled to the common path and configured to provide a band-pass response for a frequency band BX. The multiplexer may further include a second path having an output coupled to the common path such that RF signals in the first and second paths are combined and routed through the common path. The second path may be configured to provide a band-stop response for the frequency band BX such that the common path includes a wideband response that includes the frequency band BX and one or more other frequency bands.

20 Claims, 21 Drawing Sheets

(56) References Cited

U.S. PATENT DOCUMENTS

| | | | | |
|---|---|---|---|---|
| 2002/0032014 A1* | 3/2002 | Gogolla | ............... | H03D 9/00 455/196.1 |
| 2002/0132644 A1* | 9/2002 | Mellor | ............... | H01Q 1/246 455/562.1 |
| 2002/0135428 A1* | 9/2002 | Gomez | ............... | H03D 7/165 331/17 |
| 2002/0167378 A1* | 11/2002 | Sawada | ............... | H03H 9/0071 333/193 |
| 2003/0088327 A1* | 5/2003 | Taori | ............... | G10L 19/018 700/94 |
| 2003/0109276 A1* | 6/2003 | Wilson | ............... | H04B 1/0057 455/552.1 |
| 2003/0224746 A1* | 12/2003 | Contopanagos | ......... | H03H 7/03 455/194.2 |
| 2004/0137947 A1* | 7/2004 | Nimmo-Smith | ....... | H01Q 21/30 455/561 |
| 2005/0017823 A1* | 1/2005 | Sakano | ............... | H03H 9/0576 333/133 |
| 2006/0014510 A1* | 1/2006 | Yamamoto | ............ | H03J 1/005 455/260 |
| 2006/0267707 A1* | 11/2006 | Tang | ............... | H01P 1/2136 333/126 |
| 2007/0002984 A1* | 1/2007 | Hoon | ............... | H04B 1/3805 375/350 |
| 2007/0021088 A1* | 1/2007 | Sheng-Fuh | ............ | H03F 1/565 455/319 |
| 2007/0223933 A1* | 9/2007 | Kim | ............... | H04B 10/58 398/158 |
| 2008/0258983 A1* | 10/2008 | Bauer | ............... | H03H 9/6409 343/722 |
| 2010/0222010 A1* | 9/2010 | Ozaki | ............... | H02J 5/005 455/77 |
| 2012/0001735 A1* | 1/2012 | Fink | ............... | G06K 19/0675 340/10.4 |
| 2012/0331501 A1* | 12/2012 | Shafer | ............... | H03H 7/075 725/27 |
| 2013/0170405 A1* | 7/2013 | Yan | ............... | H03H 9/02015 370/277 |
| 2014/0030997 A1* | 1/2014 | Sundstrom | ............ | H03D 7/166 455/326 |
| 2014/0035702 A1* | 2/2014 | Black | ............... | H03H 7/075 333/186 |
| 2014/0112213 A1* | 4/2014 | Norholm | ............... | H04B 1/56 370/277 |
| 2014/0314132 A1* | 10/2014 | Leuschner | ........... | H04B 5/0075 375/224 |

* cited by examiner

WIDEBAND MULTIPLEXER FOR RADIO-FREQUENCY APPLICATIONS

CROSS-REFERENCE TO RELATED APPLICATIONS

This application claims priority to U.S. Provisional Application No. 62/183,608 filed Jun. 23, 2015, entitled "WIDEBAND MULTIPLEXER FOR RADIO-FREQUENCY APPLICATIONS," the disclosure of which is hereby expressly incorporated by reference herein in its respective entirety.

BACKGROUND

Field

The present disclosure relates to multiplexers (such as diplexers and triplexers) that may be capable of providing a wideband capability.

Description of the Related Art

Many designs for wireless devices such as smartphones and tablets desire lower cost and smaller size, while simultaneously increasing complexity and performance requirements. Radio-frequency (RF) front-end modules (FEMs) provide a platform where at least some of such designs can be implemented. For example, functionalities associated with switching, filtering, and power amplifiers (PAs) can be implemented in a FEM.

SUMMARY

In some implementations, the present disclosure relates to a multiplexer for processing of radio-frequency (RF) signals. The multiplexer includes a common path configured to receive a plurality of RF signals. The multiplexer also includes a first path having an output coupled to the common path and configured to provide a band-pass response for a frequency band BX. The multiplexer further includes a second path having an output coupled to the common path such that RF signals in the first and second paths are combined and routed through the common path, the second path configured to provide a band-stop response for the frequency band BX such that the common path includes a wideband response that includes the frequency band BX and one or more other frequency bands.

In some embodiments, the first path includes a band-pass filter configured to provide the band-pass response.

In some embodiments, the second path includes a resonant circuit configured to provide the band-stop response.

In some embodiments, the resonant circuit includes an LC resonant circuit.

In some embodiments, the resonant circuit includes a SAW (surface acoustic wave) resonant circuit.

In some embodiments, the multiplexer is a diplexer.

In some embodiments, the multiplexer further includes a third path having an output coupled to the common path such that an RF signal in the third path is combined with the RF signals in the first and second paths and routed through the common path, the third path configured to provide a band-pass response for another frequency band BY.

In some embodiments, the multiplexer is a triplexer.

In some embodiments, the other frequency band BY is covered by the wideband response of the common path.

In some embodiments, the third path includes a band-pass filter configured to provide the band-pass response for the frequency band BY.

In some embodiments, the second path includes a resonant circuit configured to provide the band-stop response.

In some embodiments, the resonant circuit includes an LC resonant circuit.

In some embodiments, the LC resonant circuit is configured to provide a plurality of stop-band responses.

In some embodiments, the LC resonant circuit includes one or more switchable capacitances.

In some embodiments, the resonant circuit includes a SAW (surface acoustic wave) resonant circuit.

In some embodiments, the SAW resonant circuit includes a first and second SAW elements arranged in series, the first SAW element configured to provide the stop-band response for the frequency band BX, and the second SAW element configured to provide the stop-band response for the frequency band BY.

In some embodiments, the SAW resonant circuit is substantially free of switches.

In some implementations, the present disclosure relates to a method for multiplexing radio-frequency (RF) signals. The method includes providing a common path to receive a plurality of RF signals. The method also includes processing a first RF signal through a first path such that the processed first RF signal is routed to the common path, the processing of the first RF signal including band-passing the first RF signal for a frequency band BX. The method further includes processing a second RF signal through a second path such that the processed second signal is routed to the common path, the processing of the second RF signal including band-stopping the second RF signal for the frequency band BX such that the common path includes a wideband response that includes the frequency band BX and one or more other frequency bands.

In some implementations, the present disclosure relates to a radio-frequency (RF) module. The RF module includes a packaging substrate configured to receive a plurality of components. The RF module also includes a multiplexer implemented on or within the packaging substrate, the multiplexer including a common path configured to receive a plurality of RF signals, the multiplexer further including a first path having an output coupled to the common path and configured to provide a band-pass response for a frequency band BX, the multiplexer further including a second path having an output coupled to the common path such that RF signals in the first and second paths are combined and routed through the common path, the second path configured to provide a band-stop response for the frequency band BX such that the common path includes a wideband response that includes the frequency band BX and one or more other frequency bands.

In some embodiments, the first path includes a band-pass filter configured to provide the band-pass response.

In some embodiments, the second path includes a resonant circuit configured to provide the band-stop response.

In some embodiments, the RF module further includes a low-noise amplifier (LNA) implemented in each of the first and second paths.

In some embodiments, the LNAs are implemented upstream of the band-pass filter and the resonant circuit.

In some embodiments, the RF module is a front-end module.

In some embodiments, the RF module is a diversity receive (DRx) module.

In some implementations, the present disclosure relates to a wireless device. The wireless device includes a receiver configured to process radio-frequency (RF) signals. The wireless device also includes an RF module in communication with the receiver, the RF module including a multiplexer having a common path configured to receive a plurality of RF signals, the multiplexer further including a first path having an output coupled to the common path and configured to provide a band-pass response for a frequency band BX, the multiplexer further including a second path having an output coupled to the common path such that RF signals in the first and second paths are combined and routed through the common path, the second path configured to provide a band-stop response for the frequency band BX such that the common path includes a wideband response that includes the frequency band BX and one or more other frequency bands. The wireless device further includes an antenna in communication with the RF module, the antenna configured to receive the RF signals.

DETAILED DESCRIPTION OF SOME EMBODIMENTS

The headings provided herein, if any, are for convenience only and do not necessarily affect the scope or meaning of the claimed invention.

Figure 1:
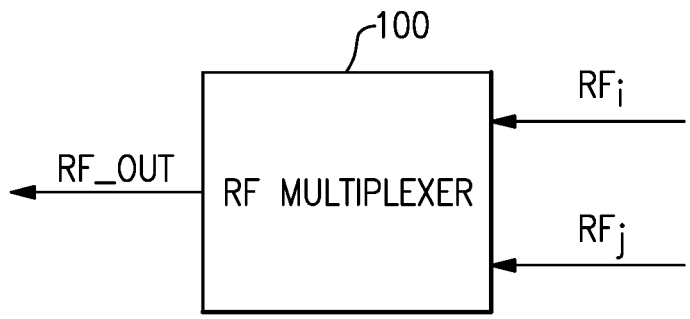
FIG. 1 shows a block diagram of a multiplexer, in accordance with some embodiments of the present disclosure.

FIG. 1 shows a block diagram of a multiplexer 100 that can include one or more features as described herein. In some embodiments, such a multiplexer can be configured for radio-frequency (RF) applications.

Referring to FIG. 1, the multiplexer 100 can be configured to combine a plurality of signal paths, including those associated with a first signal $RF_i$ and a second signal $RF_j$, into a common path RF_OUT. For the purpose of description, a signal path and a corresponding signal may be used interchangeably. For example, $RF_i$ may be used to refer to the first signal and/or to the path associated with that signal, depending on context.

It will be understood that while various examples are described herein in the context of signal paths being combined into a common path, one or more features of the present disclosure can be implemented in a reversed configuration. For example, a common RF signal can be split into a plurality of signals, and such a configuration can benefit from one or more features as described herein.

Figure 2A:
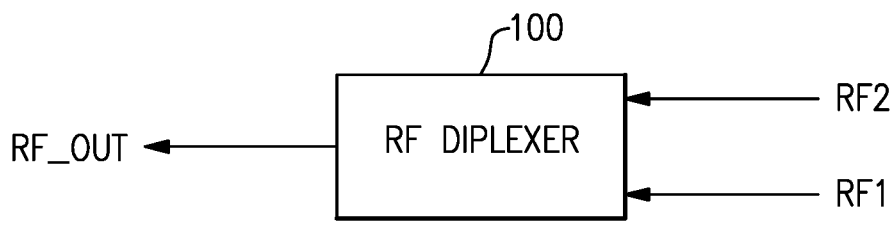
FIGS. 2A-2C show block diagrams of multiplexers, in accordance with some embodiments of the present disclosure.
Figure 2B:
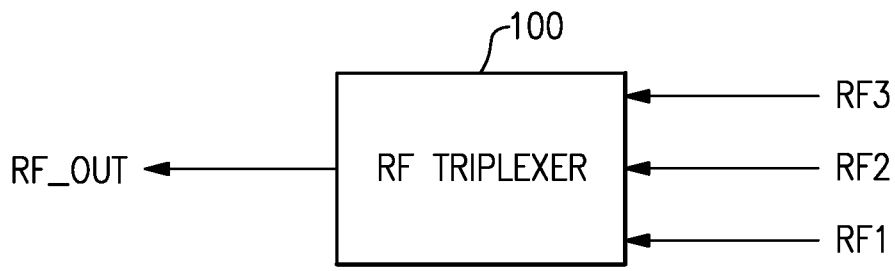
Figure 2C:
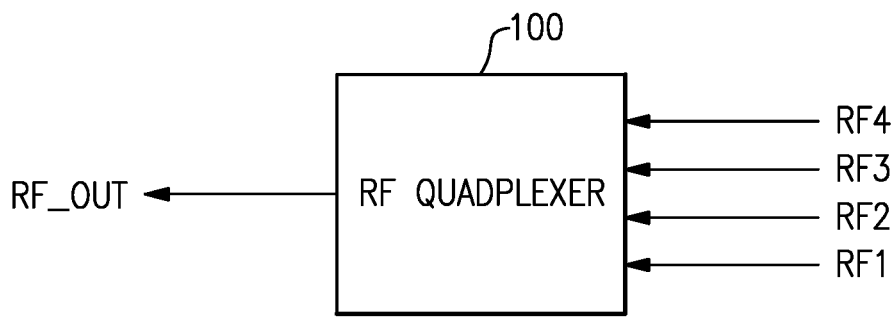

For the purpose of description, it will be understood that multiplexer or multiplexing can involve combining of two or more signal paths into a common signal path. For example, FIG. 2A shows that a multiplexer can be a diplexer 100 configured to combine two signal paths RF1, RF2 into a common signal path RF_OUT. FIG. 2B shows that a multiplexer can be a triplexer 100 configured to combine three signal paths RF1, RF2, RF3 into a common signal path RF_OUT. FIG. 2C shows that a multiplexer can be a quadplexer 100 configured to combine four signal paths RF1, RF2, RF3, RF4 into a common signal path RF_OUT. Other numbers of signal paths can be configured into a common signal path.

Figure 3A:
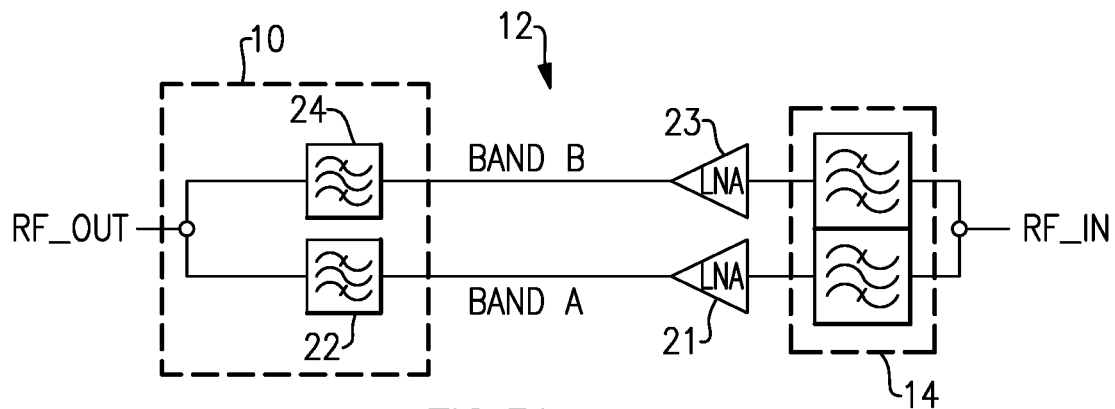
FIGS. 3A-3C show examples related to a diplexer configured to combine narrowband signals, in accordance with some embodiments of the present disclosure.
Figure 3B:
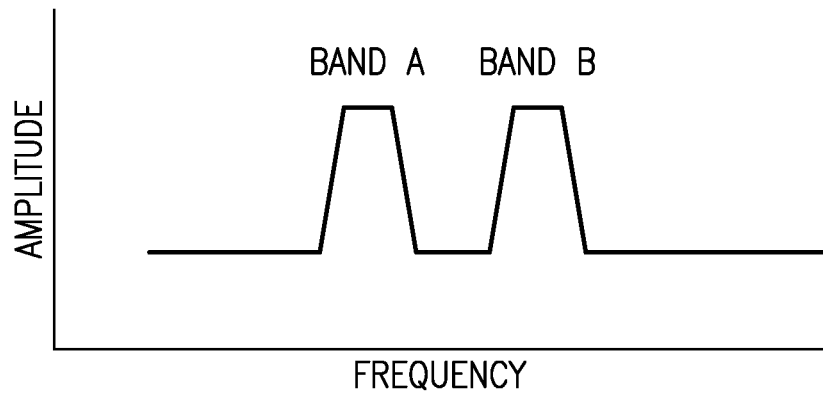
Figure 3C:
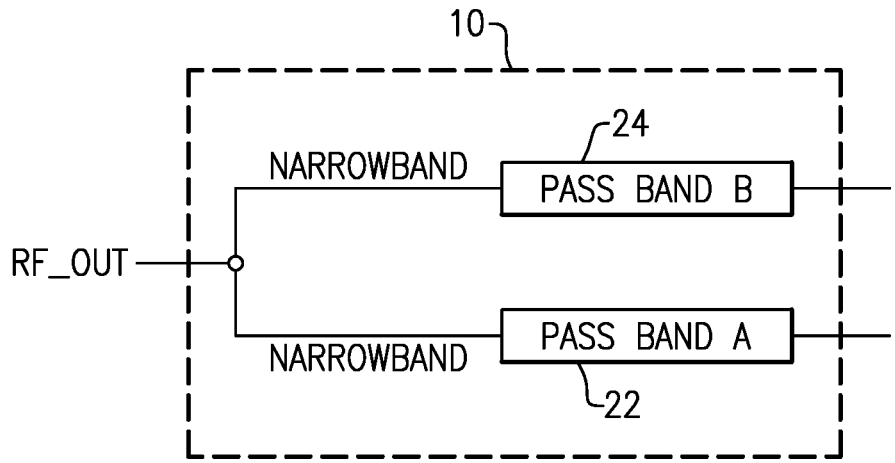

FIGS. 3A-3C show examples related to a diplexer 10 configured to combine two narrowband signals. As shown in FIG. 3A, such a diplexer can be utilized in a carrier-aggregation (CA) configuration 12 in which RF signals associated with two example bands (Band A and Band B) can be combined into a common path RF_OUT for CA operation. In the example shown, the Band A signal provided to the diplexer 10 is shown to be output from a first low-noise amplifier (LNA) 21, and the Band B signal provided to the diplexer 10 is shown to be output from a second LNA 23. The first and second LNAs 21, 23 are shown to receive and amplify signals from their respective band-pass filters (depicted as an assembly 14). The band-pass filters 14 are shown to receive signals split from a common input RF_IN.

Referring to FIG. 3A, the diplexer 10 is shown to include a first band-pass filter 22 configured to filter the amplified signal output from the first LNA 21, and a second band-pass filter 24 configured to filter the amplified signal output from the second LNA 23. The filtered signals from the first and second band-pass filters 22, 24 are shown to be combined into a common output RF_OUT.

In the example of FIG. 3A, the A-band and B-band can be nearby frequency bands suitable for CA operations. Examples of such frequency bands are described herein in greater detail. Use of the band-pass filters 22, 24 configured for such frequency bands results in a frequency response depicted in FIG. 3B, in which two narrow passbands are located near each other. Accordingly, use of the diplexer 10 is generally limited to such frequency bands.

FIG. 3C shows a more general representation of the example diplexer 10 of FIG. 3A. In FIG. 3C, a diplexer 10 is shown to include a first signal conditioning circuit 22 (such as a band-pass filter) that yields a narrowband output signal, and a second signal conditioning circuit 24 (such as a band-pass filter) that yields another narrowband output signal. Accordingly, the combined output of the diplexer 10 includes a combination of two narrow bands that are sufficiently separated (e.g., sufficiently separated for CA operations).

Described herein are examples related to multiplexers such as diplexers and triplexers that are capable of providing a wideband capability. As also described are examples to demonstrate that such wideband multiplexers can be implemented while maintaining good performance levels in other operating parameters.

Figure 4:
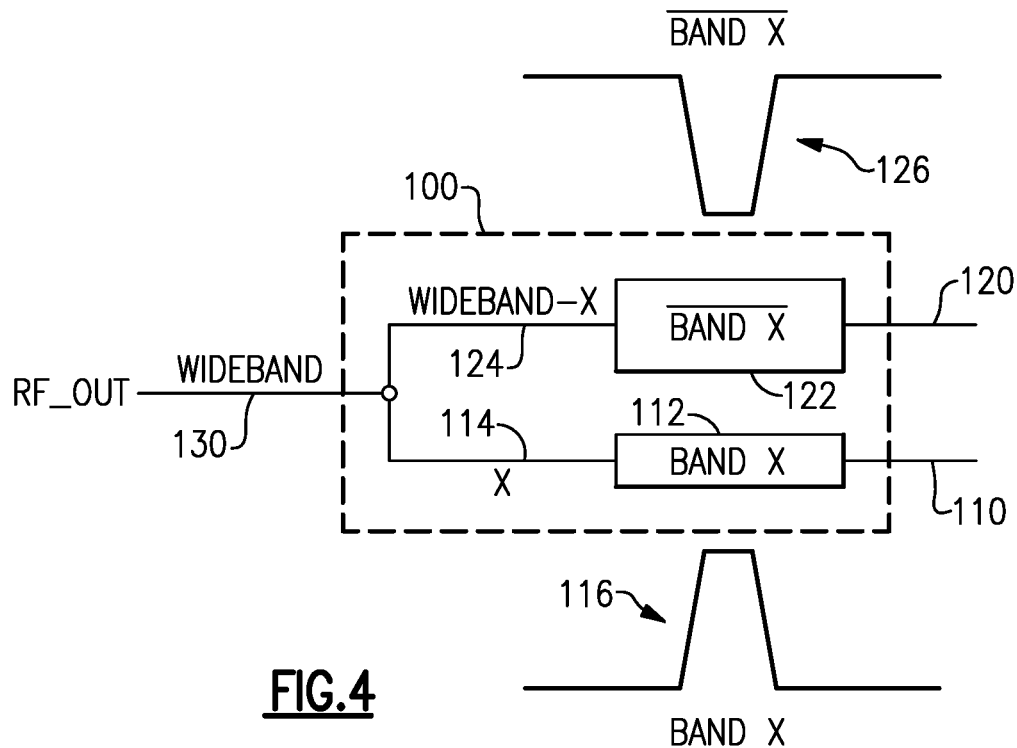
FIG. 4 shows a block diagram of a multiplexer, in accordance with some embodiments of the present disclosure.

FIG. 4 depicts a multiplexer 100 that can desirably provide wideband capability. The multiplexer 100 can include a first signal conditioning circuit 112 configured to substantially pass a given frequency band (Band X) so as to yield a frequency response indicated as 116 at its output 114. The multiplexer 100 can further include a second signal conditioning circuit 122 configured to pass a range of frequency about Band X and larger than the width associated Band X, but not pass Band X. Accordingly, the signal conditioning circuit 122 and its corresponding frequency response 126 at the output 124 is indicated as $\overline{BandX}$.

In some embodiments, the first signal conditioning circuit 112 can be a band-pass filter configured to pass Band X, and the second signal conditioning circuit 122 can be a resonant circuit, such as a tank circuit, tuned to substantially block Band X. Examples of such a resonant circuit are described herein in greater detail.

In some embodiments, the foregoing responses of the first and second conditioning circuits 112, 122 can be expressed algebraically, in which the passage of Band X is represented as X, and the $\overline{BandX}$ response is represented as Wideband—X. Accordingly, when the output paths 114 and 124 (and thus the corresponding frequency responses 116, 126) are combined into a common path, the resulting frequency can be a wideband response (Wideband) with little or no dip in amplitude at or near Band X.

Figure 5:
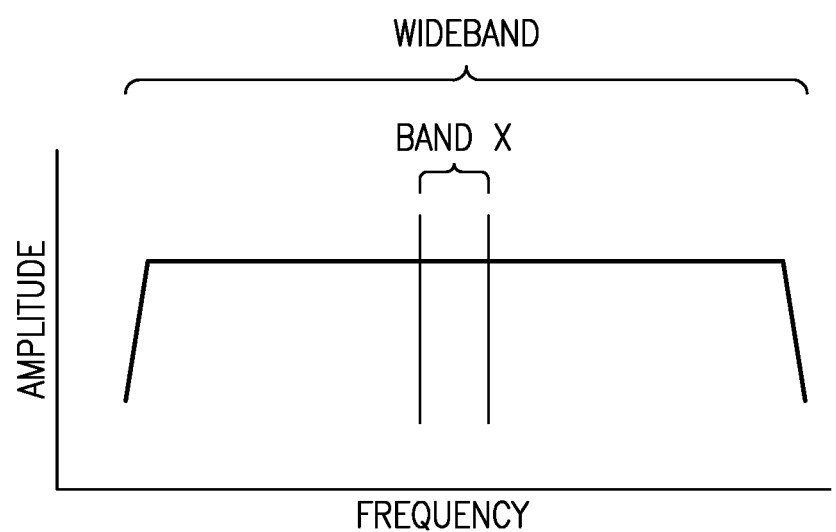
FIG. 5 shows an example of a wideband response, in accordance with some embodiments of the present disclosure.

FIG. 5 depicts an example of such a wideband response that can be obtained relative to Band X. It will be understood that Band X can be located anywhere within the wideband range.

In some embodiments, Band X can be a narrowband. For the purpose of description, such a narrowband can include a frequency range associated with a cellular band in some standard. Examples of such standard cellular bands are described herein in greater detail. It will be understood that such a narrowband can also include a frequency range associated with a sub-band which is one of a plurality of frequency segments of, for example, a cellular band.

For the purpose of description, a wideband can include a frequency range that includes the foregoing Band X, as well as one or more other narrowbands. In some embodiments, such Band X and one or more other narrowbands can be suitable for CA operations, including downlink CA operations. Examples of such a wideband are described herein in greater detail.

FIGS. 6-25 show various examples related to multiplexers having, among others, the foregoing wideband capability. FIGS. 6-12 show examples in which multiplexers can be diplexers. FIG. 13-25 show examples in which multiplexers can be triplexers.

Figure 6:
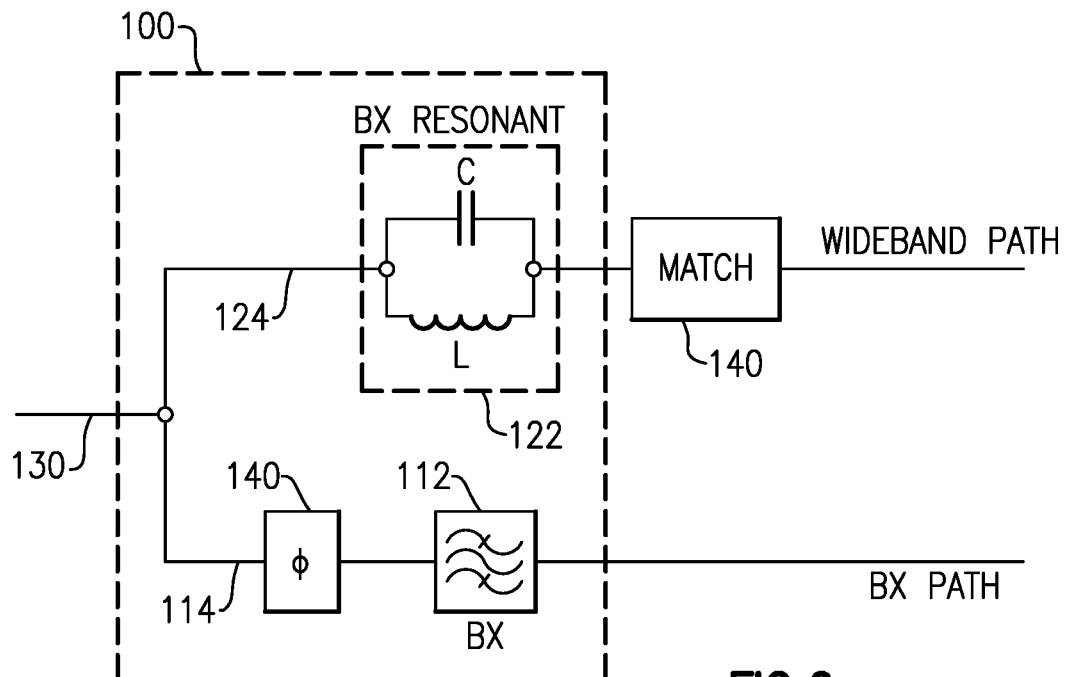
FIG. 6 shows a block diagram of a diplexer, in accordance with some embodiments of the present disclosure.

FIG. 6 shows an example of a diplexer 100 in which a first signal conditioning circuit can be a band-pass filter 112 configured for passage of a given band (Band X, or BX), and a second signal conditioning circuit can be an LC resonant circuit configured for passage of a wideband except BX. Similarly, FIG. 7 shows an example of a diplexer 100 in which a first signal conditioning circuit can be a band-pass filter 112 configured for passage of a given band (Band X, or BX), and a second signal conditioning circuit can be a SAW (surface acoustic wave) resonant circuit configured for passage of a wideband except BX.

Figure 7:
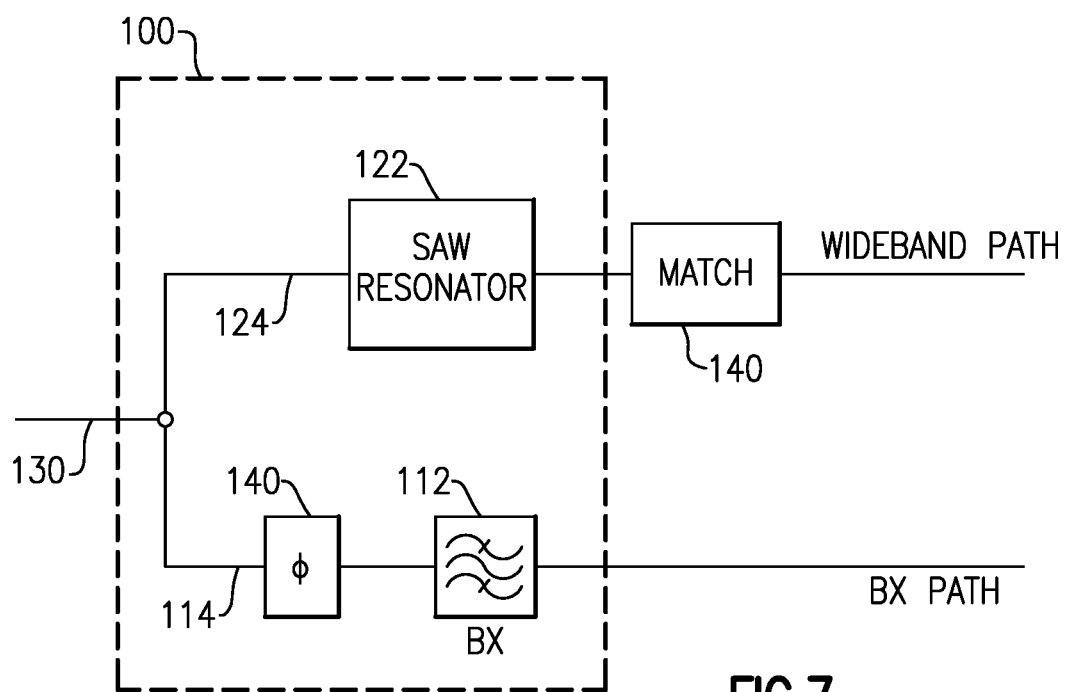
FIG. 7 shows a block diagram of a diplexer, in accordance with some embodiments of the present disclosure.

Referring to FIGS. 6 and 7, the BX band-pass filter 112 is shown to receive a signal through a BX path and output a filtered signal through an output path 114. In some embodiments, such an output path can include a phase shifting circuit 140. Such a phase shifting circuit can be configured to allow the filtered output of the BX filter 112 and the output of the resonant circuit 122 to have appropriate phases relative to each other to yield a wideband response when combined.

Referring to FIGS. 6 and 7, the resonant circuit 122 is shown to receive an input signal through a wideband path that can include a matching circuit 140. Such a matching circuit can be configured to, for example, provide impedance matching between the resonant circuit and an upstream component such as an LNA (not shown).

In the examples of FIGS. 6 and 7, it will be understood that the BX path and the wideband path providing inputs to the diplexer 100 can be coupled to, for example, outputs of respective LNAs similar to the arrangement of LNAs in the example of FIG. 3A. For the purpose of description, it will be understood that such LNAs and any other signal conditioning components upstream of the BX filter 112 and the resonant circuit 122 to be configured so that signals being routed through the BX path and the wideband path can include respective band(s). For example, an LNA upstream of the BX filter 112 can be configured to provide an operating bandwidth that includes the BX band. Similarly, an LNA upstream of the resonant circuit 122 can be a broadband LNA configured to operate in a frequency range that includes a wideband as described herein.

Referring to FIGS. 6 and 7, the outputs of the BX filter 112 and the resonant circuit 122 are shown to be combined into a common output 130. As described herein, such a combined output can have a wideband frequency response.

Figure 8:
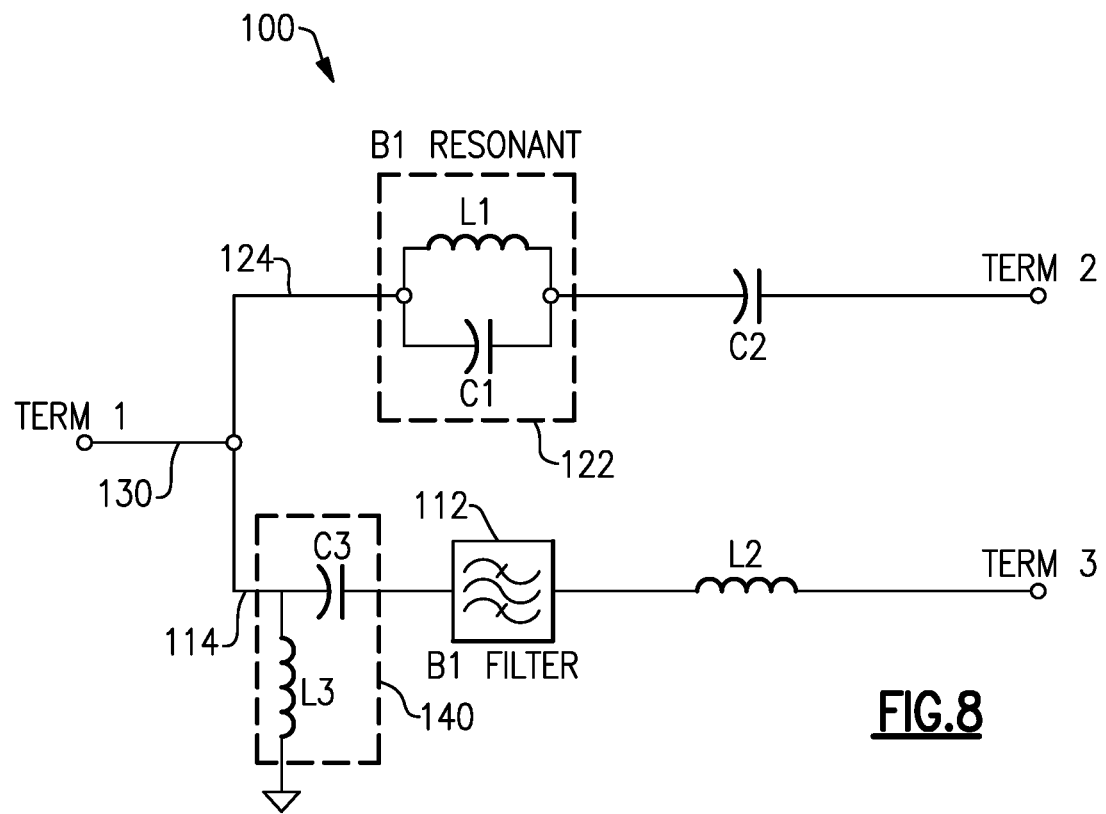
FIG. 8 shows a block diagram of a diplexer, in accordance with some embodiments of the present disclosure.
Figure 9:
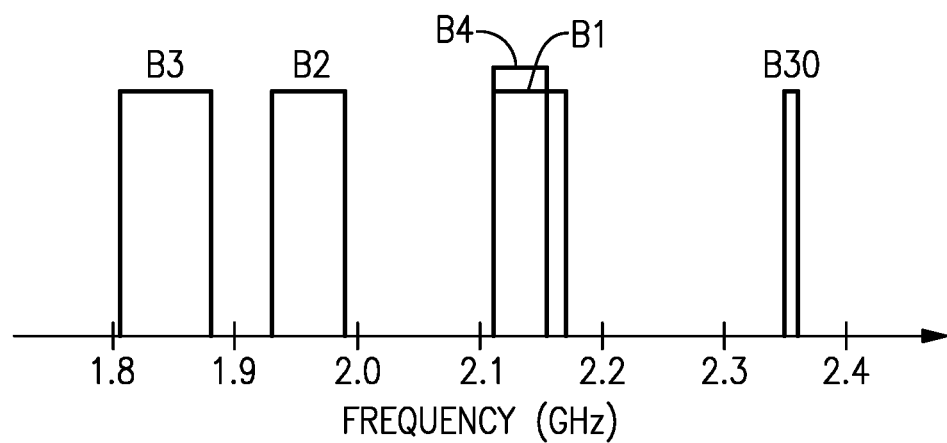
FIG. 9 shows example frequency ranges, in accordance with some embodiments of the present disclosure.

FIG. 8 shows an example diplexer 100 that can be a more specific example of FIG. 6, where the diplexer 100 includes a band-pass filter 122 configured for B1 band operation, and an LC resonant circuit 122 configured for B1 notch operation. As shown in FIG. 9, B1 band has a frequency range of 2.11 GHz to 2.17 GHz for receive (Rx) operation. As also shown in FIG. 9, B4 band (2.11 GHz-2.155 GHz for Rx) can be covered substantially completely by B1 band. Accordingly, the B1 band may be referred to as B1/B4 band, or even B4 band herein, unless distinction between the two example bands are stated explicitly.

Referring to FIGS. 8 and 9, the B1 resonant circuit 122 can be configured to allow passage of one or more bands near B1 band (e.g., B3 (1.805 GHz-1.88 GHz for Rx), B2 (1.93 GHz-1.99 GHz for Rx) and B30 (2.35 GHz-2.36 GHz for Rx)), and substantially notch B1. Various examples related to operating performance with respect to one or more of such bands near B1 are described herein in greater detail.

In the example of FIG. 8, the LC resonant circuit 122 can include a parallel combination of an inductance L1 and a capacitance C1. Further, a phase shifting circuit 140 along the B1 output path 114 can include a capacitance C3 and an inductive coupling to ground of a node downstream of C3, through an inductance L3. Further, an inductance L2 upstream of the B1 filter 112 and a capacitance C2 upstream of the LC resonant circuit 122 can be configured to provide impedance matching functionality for the B1 filter 112 and the LC resonant circuit 122, respectively.

Figure 10:
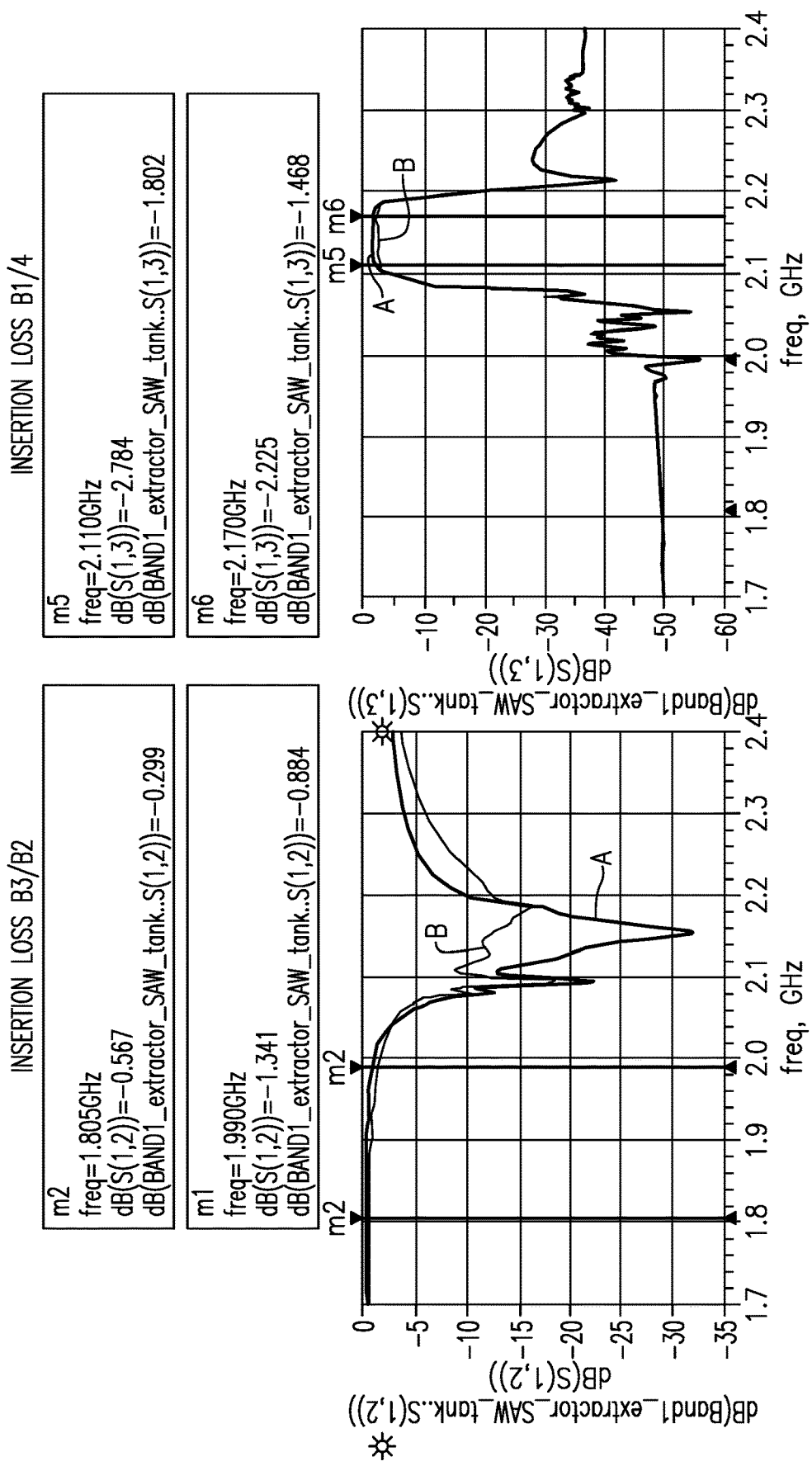
FIG. 10 shows example S-parameters, in accordance with some embodiments of the present disclosure.

Although not shown, a diplexer 100 having a B1 filter and a corresponding B1 resonant circuit can be implemented, similar to the example of FIG. 8, where the B1 resonant circuit can utilize a SAW resonator. FIG. 10 shows example S-parameters associated with terminals indicated in FIG. 8 as Term1, Term2 and Term3. Example values of capacitances and inductances listed in Table 1 were utilized to obtain such responses.

TABLE 1

| Circuit element | Approximate value |
|---|---|
| L1 | 0.78 nH |
| L2 | 1.00 nH |
| L3 | 9.165 nH |
| C1 | 7.00 pF |
| C2 | 4.00 pF |
| C3 | 5.29 pF |

In Table 1, L1 and C1 are for the LC resonant circuit 122 of FIG. 8. L2, L3, C2 and C3 are for both of the diplexers having B1 LC resonant circuit 122 (FIG. 8) and B1 SAW resonant circuit (not shown).

In FIG. 10, curve B in the right panel represents an insertion loss plot at Term3 when the B1 resonant circuit is an LC resonant circuit (FIG. 8), and curve A in the same panel represents an insertion loss plot at Term3 when the B1 resonant circuit is a SAW resonant circuit.

Also referring to FIG. 10, curve B in the left panel represents an insertion loss plot at Term2 when the B1 resonant circuit is an LC resonant circuit (FIG. 8), and curve A in the same panel represents an insertion loss plot at Term2 when the B1 resonant circuit is a SAW resonant circuit.

Based on the foregoing examples of insertion loss plots, one can see that the B1-filtered response (upper right panel) shows a well-defined band as expected. For the B1 resonant circuit response, one can see that both of the LC resonant circuit and the SAW resonant circuit display excellent passband property, at least between 1.850 GHz to 1.990 GHz which covers B3 and B2 bands.

In the example of FIG. 10, it is noted that the insertion loss for the B3 and B2 bands (left panel) ranges from about 0.5 dB to 1.3 dB for the LC resonant circuit, and about 0.3 dB to 0.9 dB for the SAW resonant circuit. Insertion loss for the B1 band (right panel) ranges from about 2.7 dB to 2.2 dB for the LC resonant circuit, and about 1.8 dB to 1.5 dB for the SAW resonant circuit. Isolation of the B1 band is about 10 dB.

Figure 11:
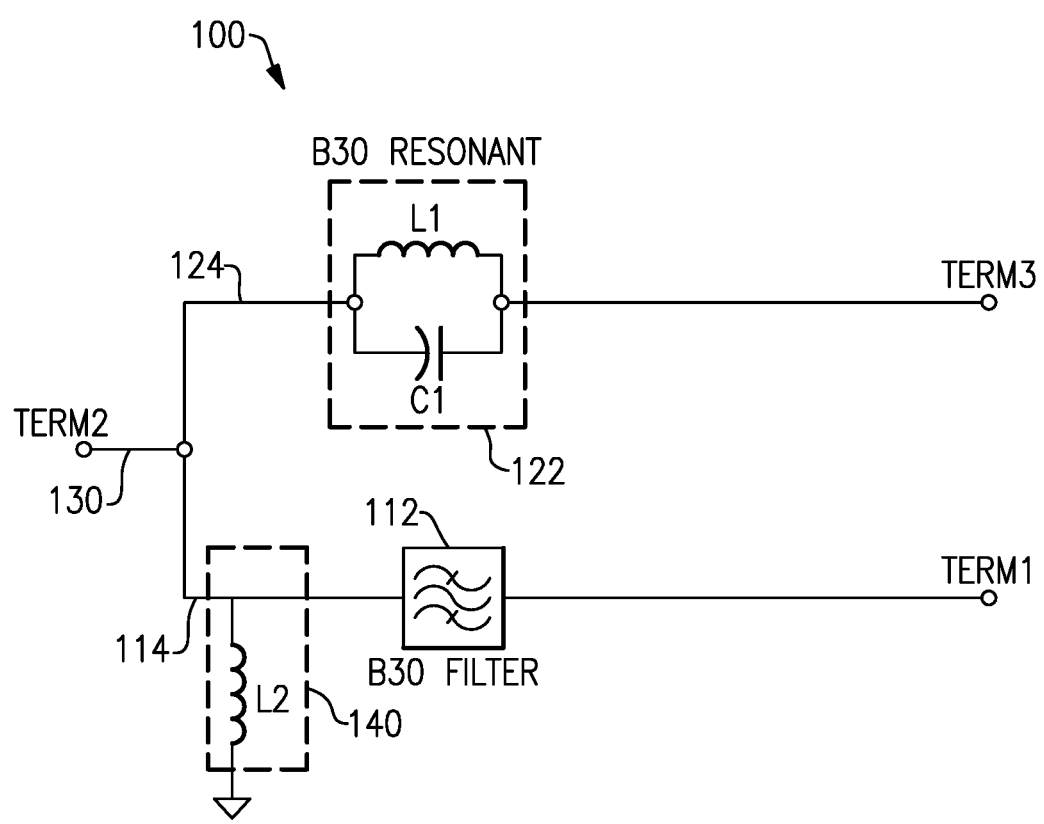
FIG. 11 shows a block diagram of diplexer, in accordance with some embodiments of the present disclosure.

FIG. 11 shows an example diplexer 100 that can be a more specific example of FIG. 6, where the diplexer 100 includes a band-pass filter 122 configured for B30 band operation, and an LC resonant circuit 122 configured for B30 notch operation. As shown in FIG. 9, B30 band has a frequency range of 2.305 GHz to 2.315 GHz for transmit (Tx) operation, and 2.350 GHz to 2.360 GHz for Rx operation.

Referring to FIGS. 11 and 9, the B30 resonant circuit 122 can be configured to allow passage of one or more bands near B30 band and substantially notch B30. In the example of FIG. 11, the LC resonant circuit 122 can include a parallel combination of an inductance L1 and a capacitance C1. Further, a phase shifting circuit 140 along the B1 output path 114 can include an inductive coupling to ground through an inductance L2.

Figure 12:
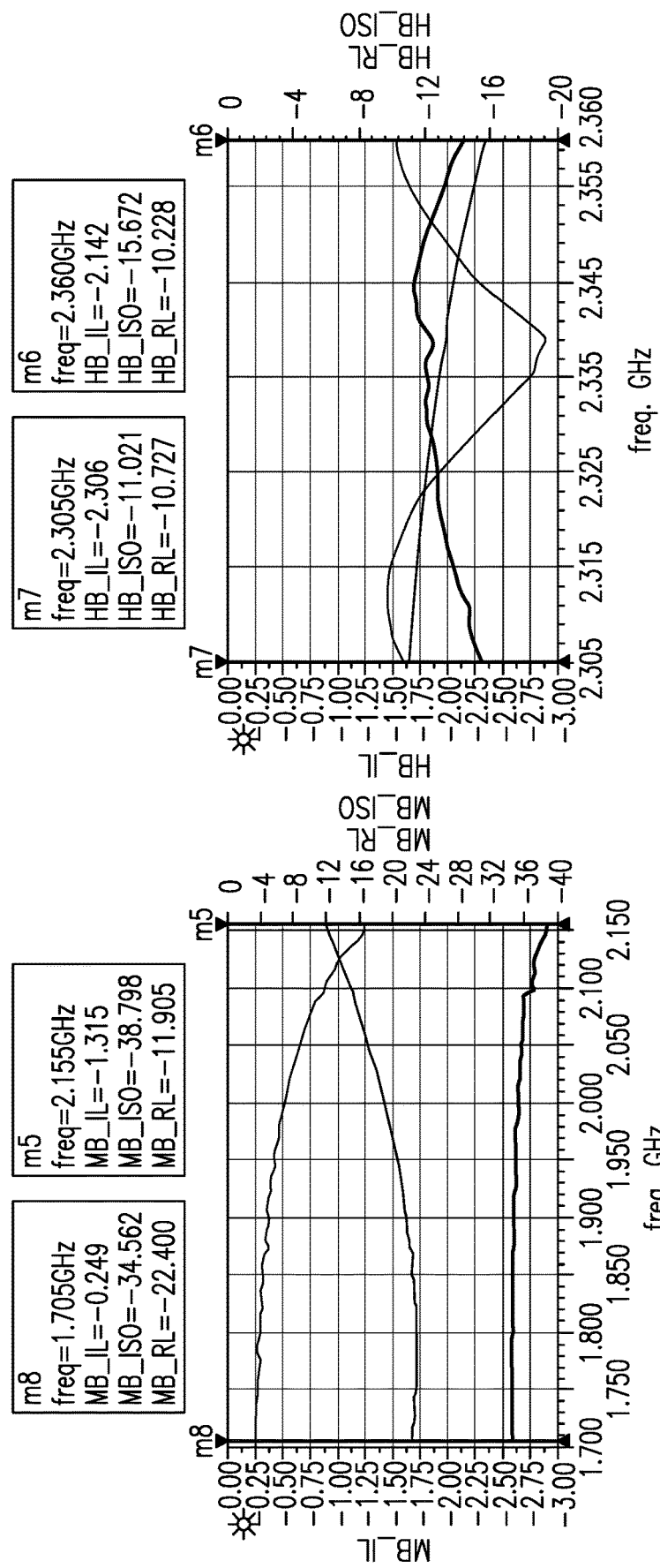
FIG. 12 shows insertion loss, return loss, and isolation plots, in accordance with some embodiments of the present disclosure.

Although not shown, a diplexer 100 having a B30 filter and a corresponding B30 resonant circuit can be implemented, similar to the example of FIG. 11, where the B30 resonant circuit is a SAW resonant circuit. FIG. 12 shows example S-parameters associated with terminals indicated in FIG. 11 as Term1, Term2 and Term3. Example values of capacitance and inductances listed in Table 2 were utilized to obtain such responses.

TABLE 2

| Circuit element | Approximate value |
|---|---|
| L1 | 0.65 nH |
| L2 | 11.0 nH |
| C1 | 6.98 pF |

In FIG. 12, the right panel shows insertion loss, return loss and isolation plots at Term1. The left panel shows insertion loss, return loss and isolation plots at Term3. One can see that the in-band performance parameters of the B30-filtered signal are similarly acceptable as in the example of FIG. 10. Similarly, the performance parameters of the lower bands passed by the B30 LC resonant circuit are also acceptable as in the example of FIG. 10.

Figure 13:
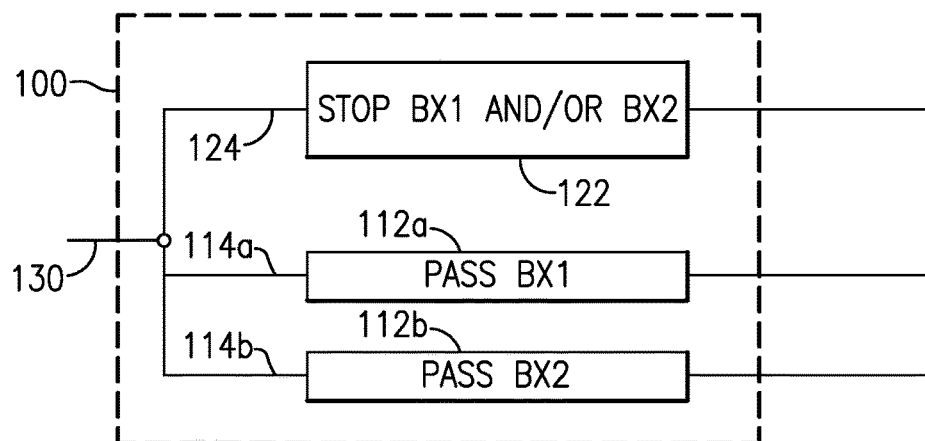
FIG. 13 shows a block diagram of triplexer, in accordance with some embodiments of the present disclosure.
Figure 14:
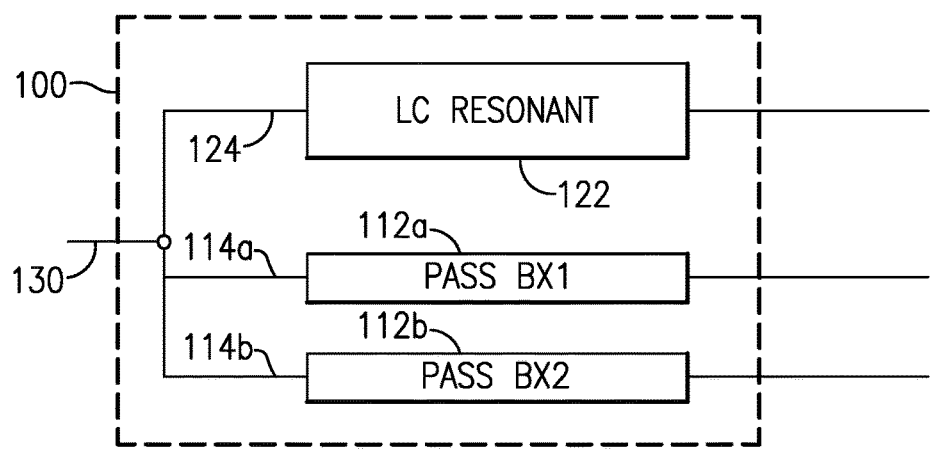
FIG. 14 shows a block diagram of triplexer, in accordance with some embodiments of the present disclosure.

FIG. 13-25 show examples in which multiplexers can be triplexers. FIG. 13 shows that a triplexer 100 can include three signal paths, with two being configured to pass first and second bands BX1, BX2, and the third being configured to stop either or both of BX1 and BX2. In the example shown in FIG. 13, the first signal path is shown to include a first circuit 112a configured to pass the first band BX1, and the second signal path is shown to include a second circuit 112b configured to pass the second band BX2. The third path is shown to include a circuit 122 configured to substantially stop either or both of BX1 and BX2. Output paths 114a, 114b, 124 corresponding to the circuits 114a, 114b, 124 are shown to be combined into a common path 130. Examples related to the circuits 114a, 114b, 124 are described herein in greater detail.

Figure 15:
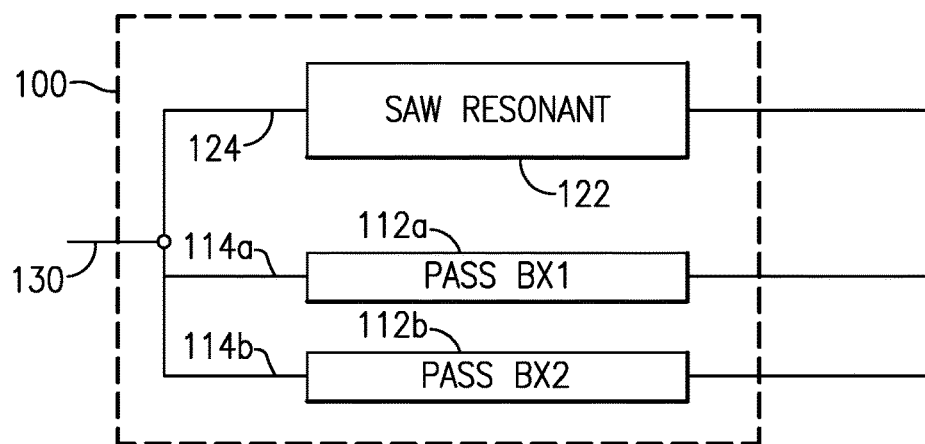
FIG. 15 shows a block diagram of triplexer, in accordance with some embodiments of the present disclosure.

As described herein, a circuit 122 configured to stop a band can be implemented as an LC resonant circuit or a SAW resonant circuit. Accordingly, the circuit 122 of FIG. 13 can be implemented as an LC resonant circuit 122 (FIG. 14) or as a SAW resonant circuit (FIG. 15).

FIGS. 16-22 show examples related to a triplexer 100 having an LC resonant circuit 122 configured to stop either or both of B1 and B30 bands that are being filtered through respective B1 and B30 band-pass filters 112*a*, 112*b*. The B1-filtered signal is shown to be provided to an output path 114*a* through a capacitance C5, and the B30-filtered signal is shown to be provided to an output path 114*b*. The LC resonant circuit 122 is shown to output its signal to an output path 124. The output paths 114*a*, 114*b*, 124 are shown to be combined to a common path 130. A node corresponding to the common path 130 is shown to be coupled to ground through an inductance L2. Although the examples are described in the context of B1 and B30 being the filtered bands, it will be understood that one or more features of the present disclosure can also be utilized for other combinations of frequency bands.

The LC resonant circuit 122 can be configured to provide stopping functionality for different bands by including adjustability of either or both of inductance and capacitance within the resonant circuit. For example, the B1/B30 LC resonant circuit 122 of FIG. 16 can include a parallel combination of L1 and C1, and a third parallel path with a switchable (with switch S1) capacitance C2. With such a configuration, C1 can be selected to provide B1 resonance functionality (e.g., when S1 is closed). When S1 is open, the combination of C1 and C2 (e.g., C1+C2 when in parallel) can allow the resonant circuit 122 to provide B30 resonance functionality.

An input path for such an adjustable resonant circuit can include an adjustable matching circuit 140. For example, two parallel paths each with a switchable capacitance can be provided. In some embodiments, either or both of the adjustable resonant circuit and the adjustable matching circuit can include programmable capacitance functionality utilizing, for example, a switched capacitor array. The first path can include a capacitance C3 in series with a switch S2, and the second path can include a capacitance C4 in series with a switch S3. Accordingly, a number of overall capacitance values can be provided for the matching circuit 140, including C3, C4 and C3+C4.

It will be understood that other configurations utilizing different combinations of inductance(s) and/or capacitance(s) can be implemented for the resonant circuit 122 and/or the matching circuit 140.

Figure 16:
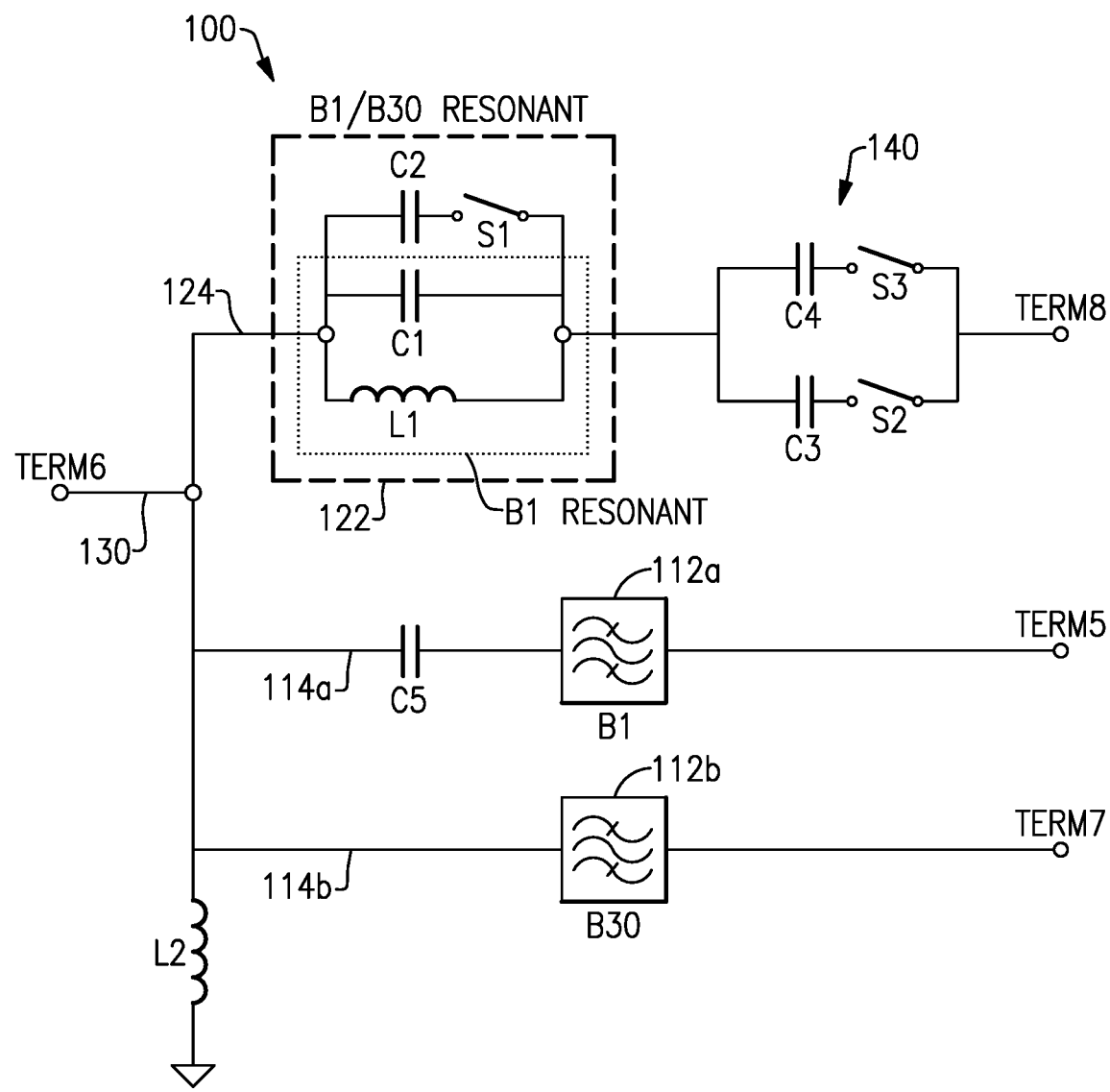
FIG. 16 shows a block diagram of triplexer, in accordance with some embodiments of the present disclosure.

In the example of FIG. 16, values of capacitances and inductances listed in Table 3 can be implemented.

TABLE 3

| Circuit element | Approximate value |
|---|---|
| L1 | 0.70 nH |
| L2 | 3.60 nH |
| C1 | 6.50 pF |
| C2 | 1.40 pF |
| C3 | 3.00 pF |
| C4 | 0.15 pF |
| C5 | 9.10 pF |

Figure 17:
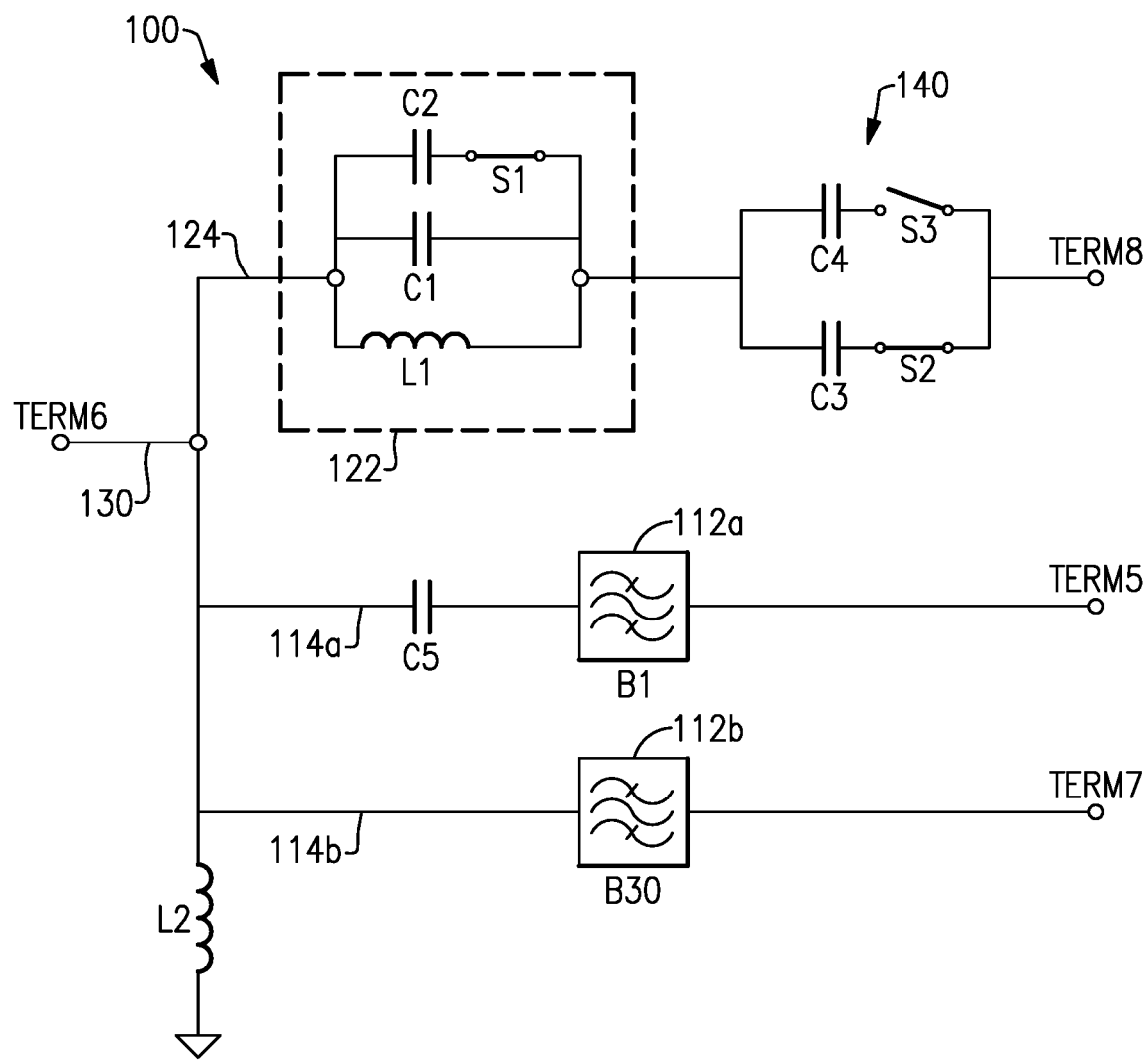
FIG. 17 shows a block diagram of triplexer, in accordance with some embodiments of the present disclosure.

FIG. 17 shows an example where the LC resonant circuit 122 of the triplexer 100 and the matching circuit 140 are configured to provide B1 resonance functionality. Thus, switch S1 of the LC resonant circuit 122 is closed, and switches S2, S3 of the matching circuit 140 are closed and open, respectively.

Figure 18:
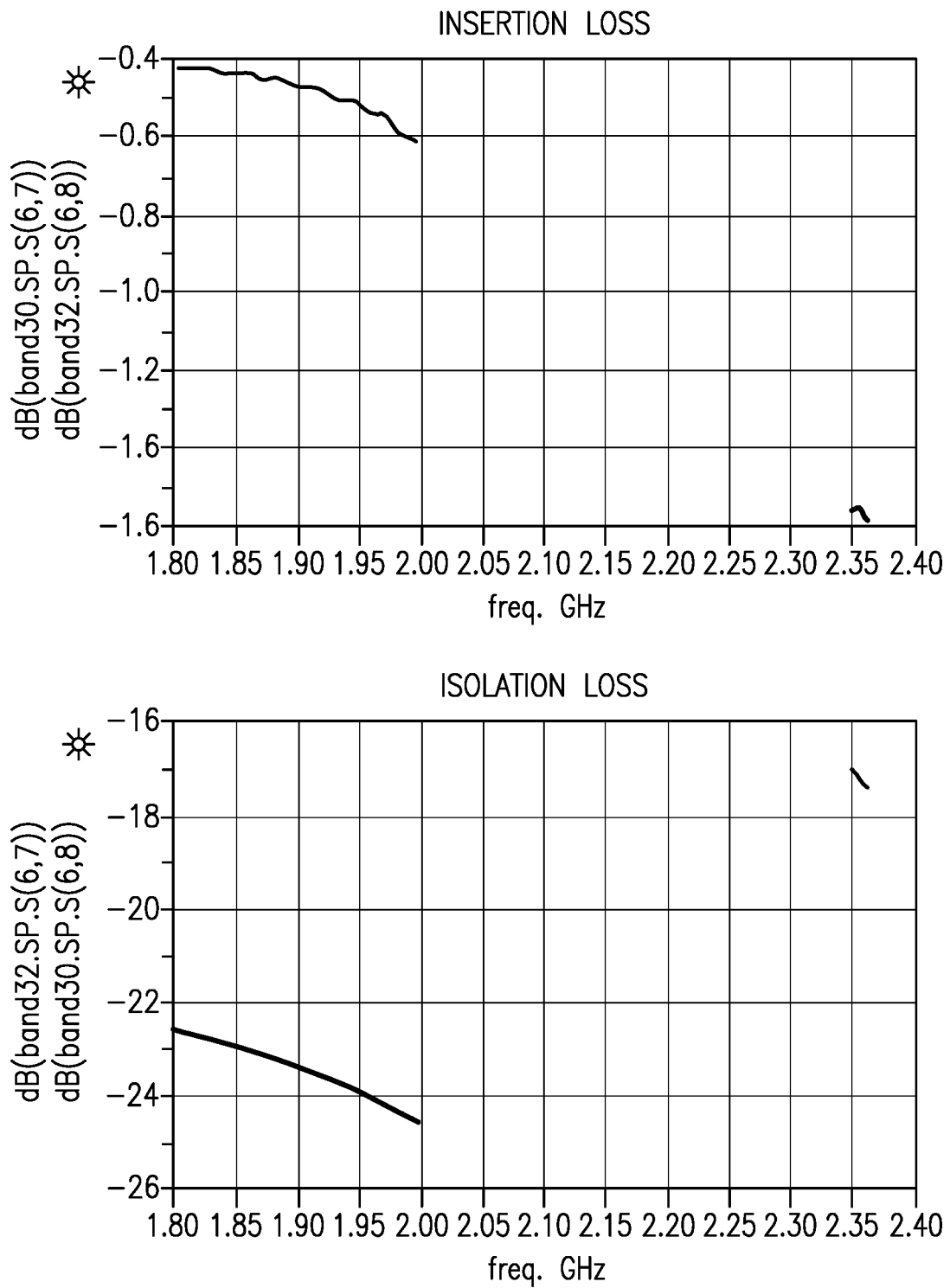
FIG. 18 shows various response plots, in accordance with some embodiments of the present disclosure.

FIG. 18 shows various response plots resulting from the example configuration of FIG. 17. The upper panel shows insertion loss plots at Term7 and at Term8. The lower panel shows isolation loss plots at Term7 and at Term8.

Figure 19:
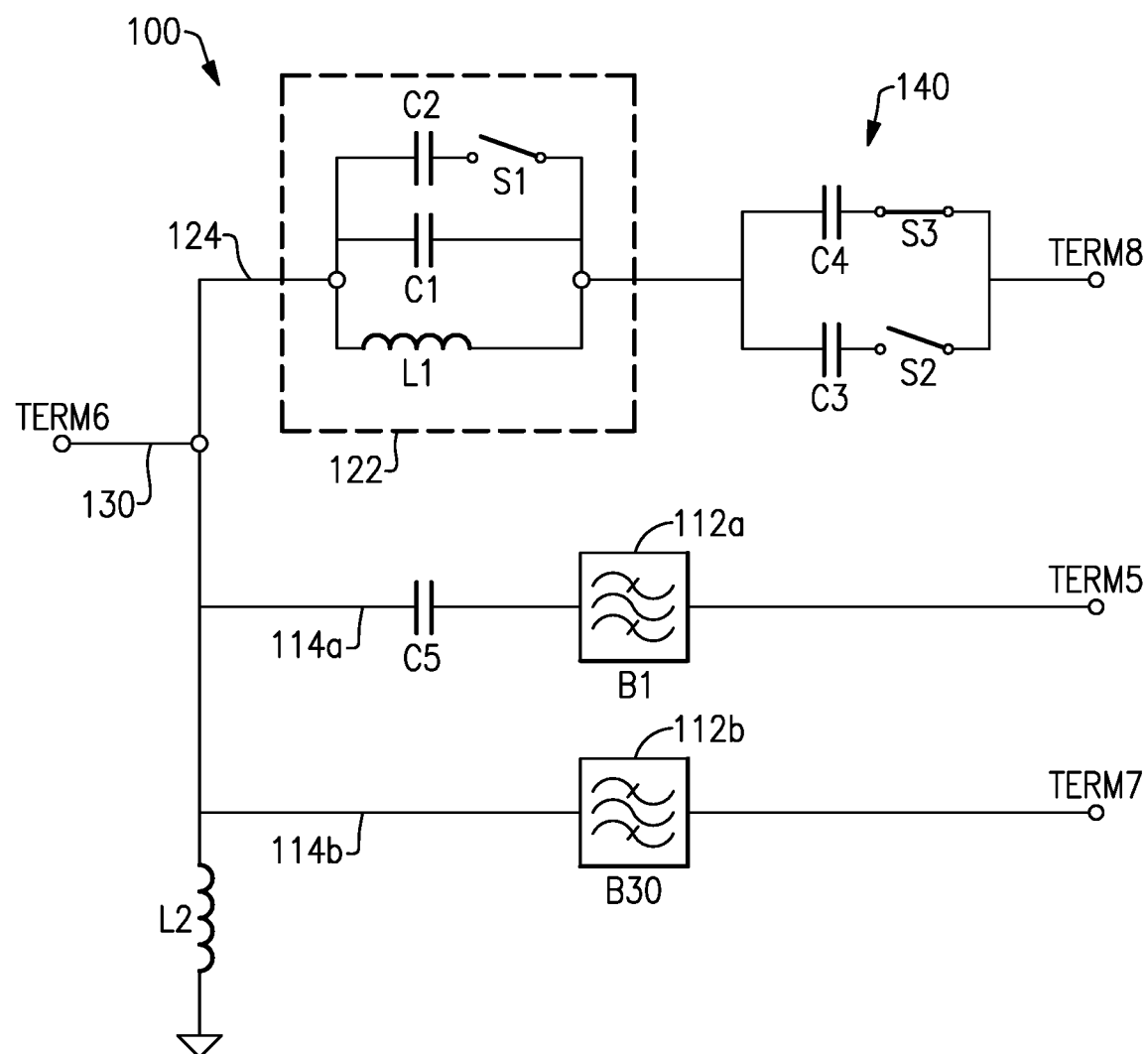
FIG. 19 shows a block diagram of a triplexer, in accordance with some embodiments of the present disclosure.

FIG. 19 shows an example where the LC resonant circuit 122 of the triplexer 100 and the matching circuit 140 are configured to provide B30 resonance functionality. Thus, switch S1 of the LC resonant circuit 122 is open, and switches S2, S3 of the matching circuit 140 are open and closed, respectively.

Figure 20:
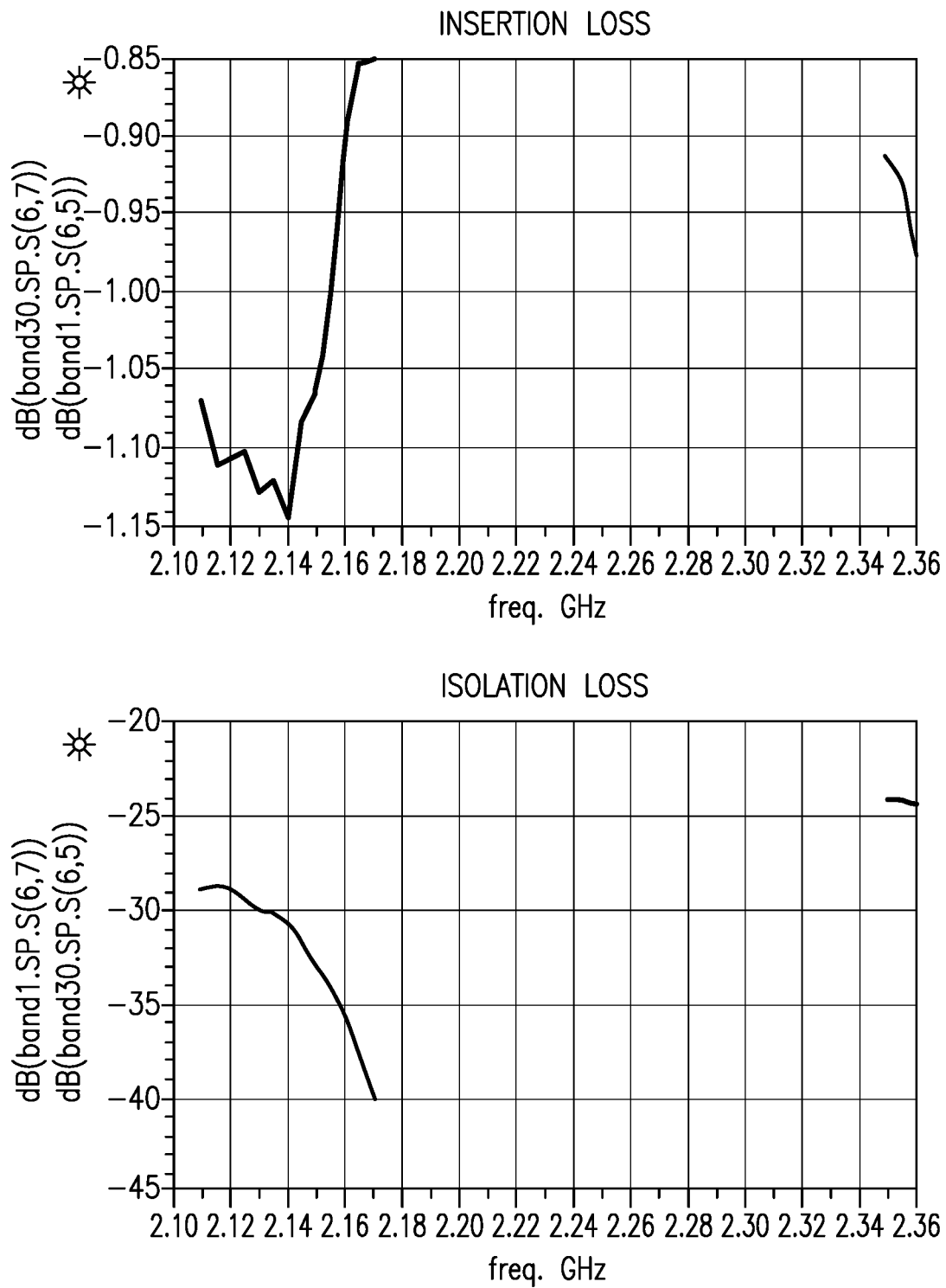
FIG. 20 shows various response plots, in accordance with some embodiments of the present disclosure.

FIG. 20 shows various response plots resulting from the example configuration of FIG. 19. The upper panel shows insertion loss plots at Term7 and at Term5. The lower panel shows isolation loss plots at Term7 and at Term5.

Figure 21:
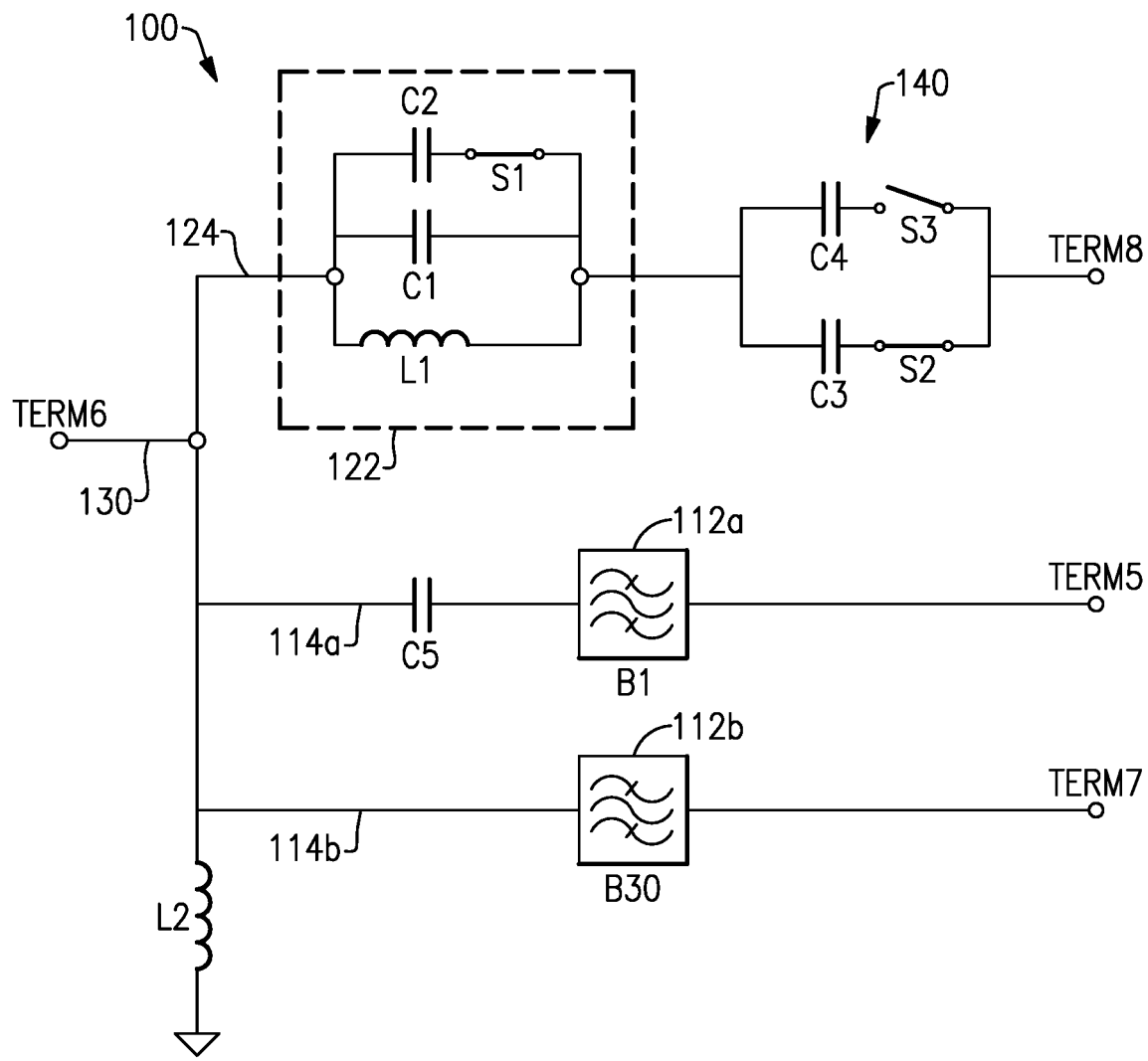
FIG. 21 shows a block diagram of a triplexer, in accordance with some embodiments of the present disclosure.

FIG. 21 shows an example where the LC resonant circuit 122 of the triplexer 100 is in the same configuration as in FIG. 19, but the matching circuit 140 configuration is different. More particularly, switches S2, S3 of the matching circuit 140 are closed and open, respectively.

Figure 22:
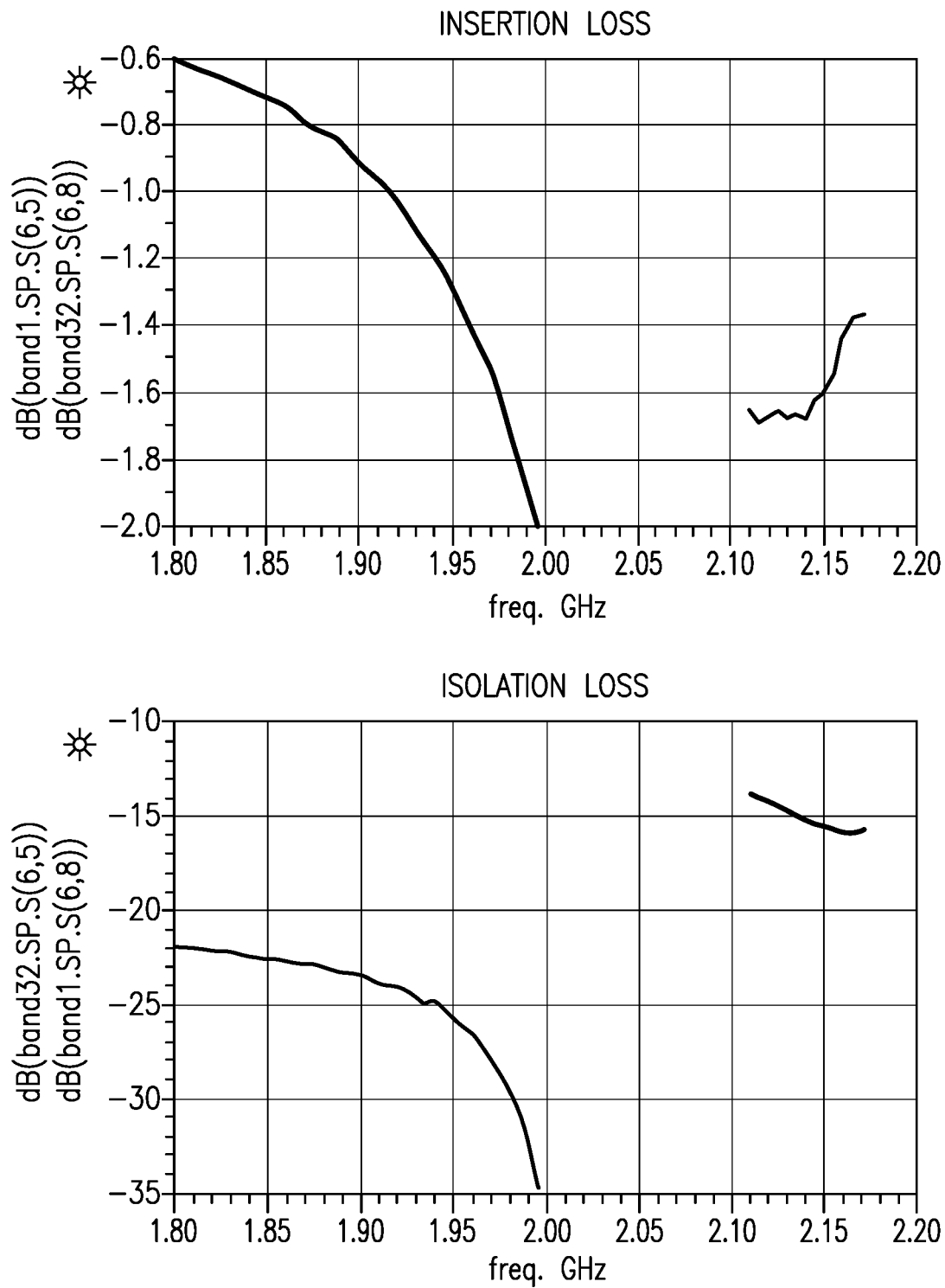
FIG. 22 shows various response plots, in accordance with some embodiments of the present disclosure.

FIG. 22 shows various response plots resulting from the example configuration of FIG. 21. The upper panel shows insertion loss plots at Term5 and at Term8. The lower panel shows isolation loss plots at Term5 and at Term8.

Figure 23:
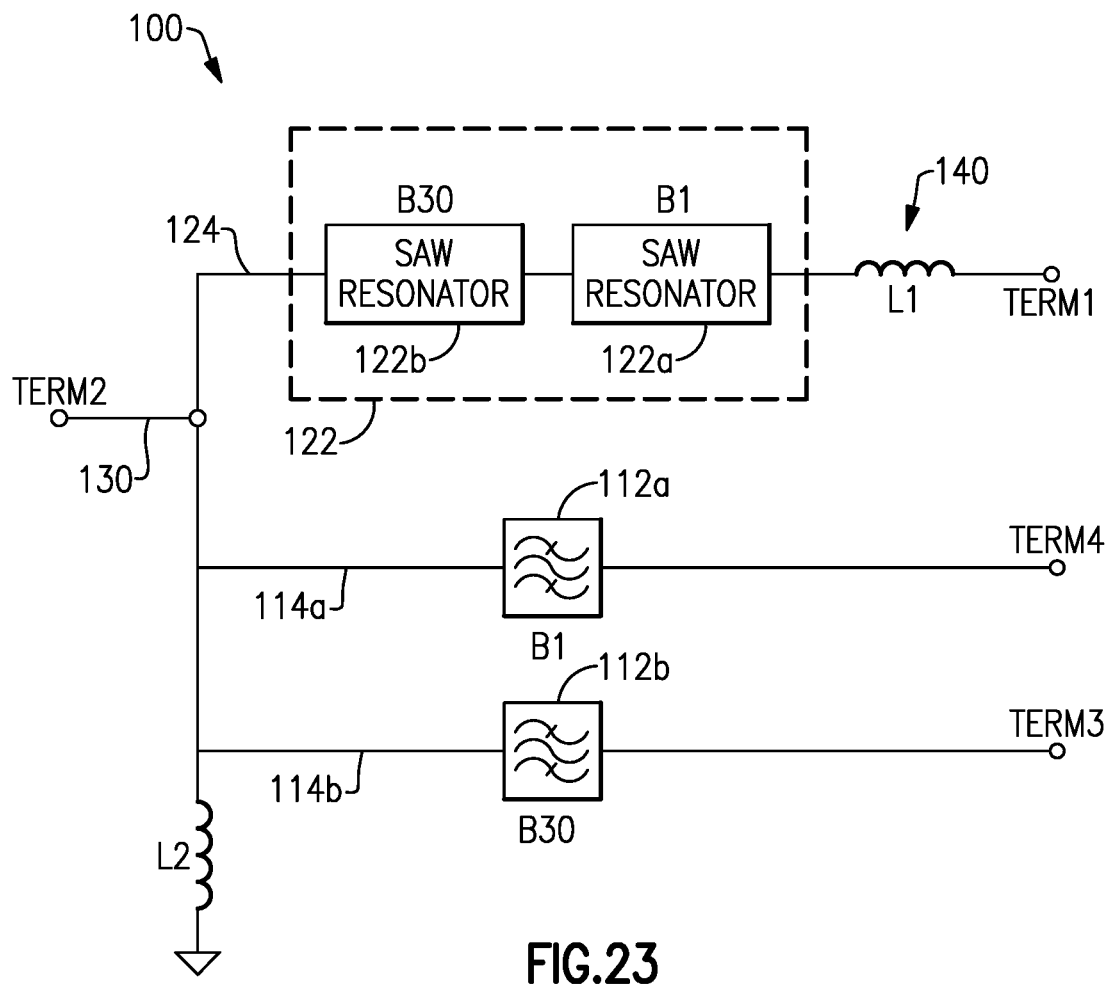
FIG. 23 shows a block diagram of a triplexer, in accordance with some embodiments of the present disclosure.
Figure 24:
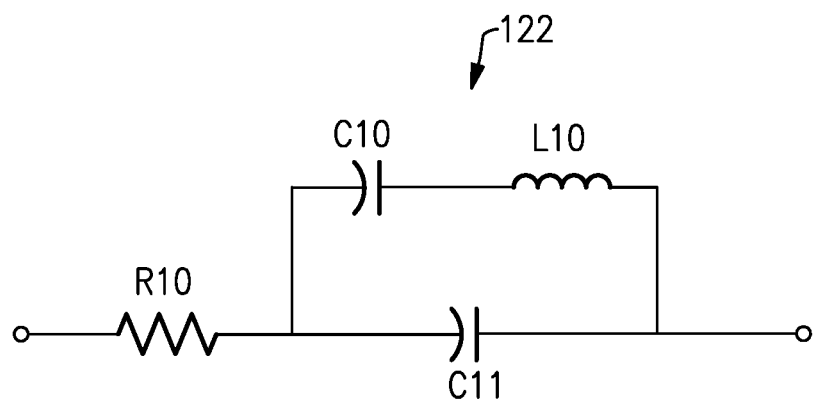
FIG. 24 shows a block diagram of a SAW resonant circuit, in accordance with some embodiments of the present disclosure.
Figure 25:
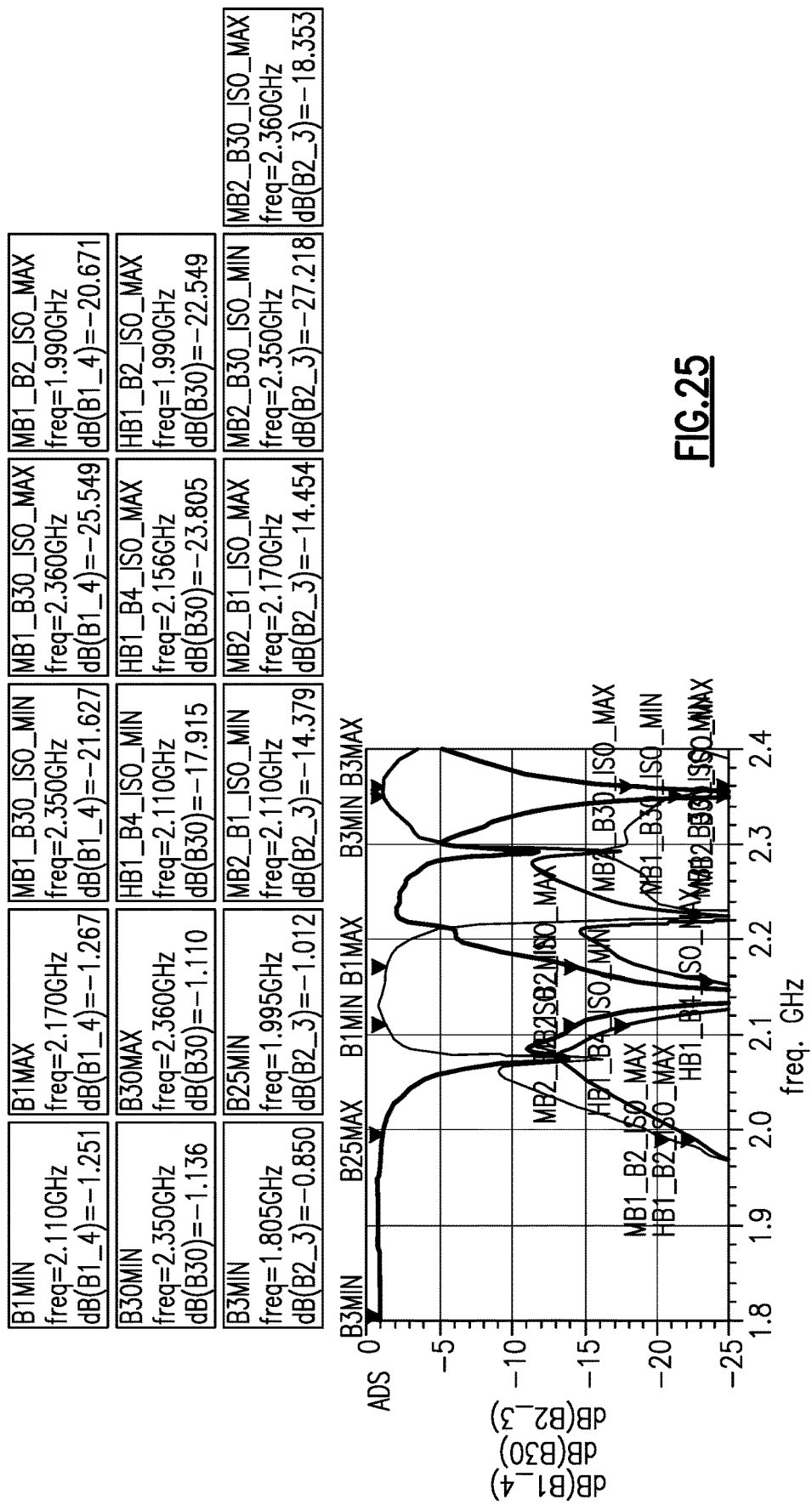
FIG. 25 shows various performance plots, in accordance with some embodiments of the present disclosure.

In the examples related to FIGS. 16-22, a given resonant circuit can be reconfigured to provide resonance functionality for different bands. FIGS. 23-25 show that in some embodiments, a triplexer 100 can include a resonant circuit assembly 122 having a plurality of resonant circuits arranged in series. For example, a B1 SAW resonant circuit 122*a* and a B30 SAW resonant circuit 122*b* can be arranged in series to operate with corresponding band-pass filters for the B1 and B30 bands. Such an in-series arrangement of resonant circuits can provide, for example, band-stop functionalities for B1 and B30 bands that are being passed through their respective band-pass filters. It will be understood that such in-series assembly of resonant circuits may also be implemented with LC resonant circuits.

In the example of FIG. 23, the arrangement of the B1 and B30 filters 112*a*, 112*b* relative to their output paths 114*a*, 114*b* and the output path 124 of the resonant circuit assembly 122 can be similar to the example of FIG. 16. In the example of FIG. 23, a matching circuit 140 is shown to include an inductance L1, and a node associated with the common path 130 is shown to be coupled to ground through an inductance L2.

FIG. 24 shows an example of how each SAW resonant circuit (122*a* or 122*b*) can be modeled. Such a model can include a series arrangement of an inductance L10 and a capacitance C10, and such a series-arrangement is shown to be arranged in parallel with a capacitance C11. The foregoing combination of C10, L10 and C11 is shown to be in series with a resistance R10. Values associated with such circuit elements can be selected to allow modeling of, for example B1 and B30 resonance functionalities.

FIG. 25 shows various performance plots associated with the example of FIGS. 23 and 24. For example, isolation plots at Term4, at Term3, and at Term1 are shown.

It is noted that in the example of FIGS. 23-25, a single state of the triplexer 100 can cover substantially all modes associated with its wideband functionality.

Figure 26:
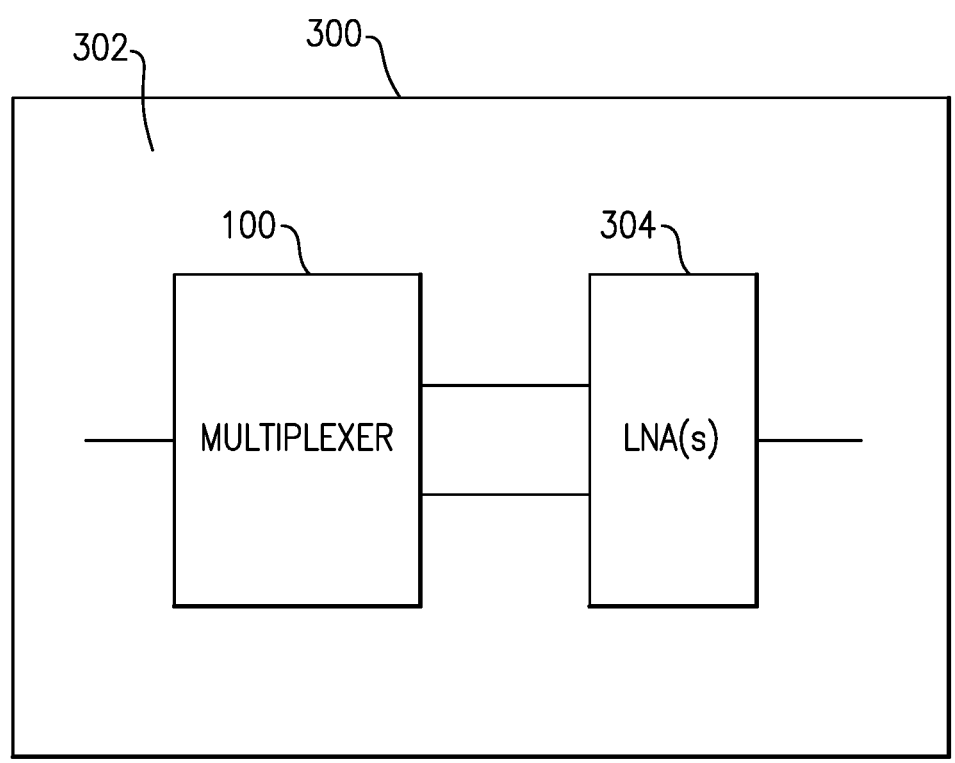
FIG. 26 shows a block diagram of a module, in accordance with some embodiments of the present disclosure.

FIG. 26 shows that in some embodiments, a multiplexer having one or more features as described herein can be implemented in a module 300. Such a module can include a packaging substrate 302 such as a laminate substrate or a ceramic substrate. The module 300 can include one or more LNAs 304 implemented on the packaging substrate 302. The module 300 can further include a multiplexer 100 having one or more features as described herein. Such a multiplexer can be configured to combine a plurality of signal path into a common path with wideband capability.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc. Although described in the context of wireless devices, it will be understood that one or more features of the present disclosure can also be implemented in other RF systems such as base stations.

Figure 27:
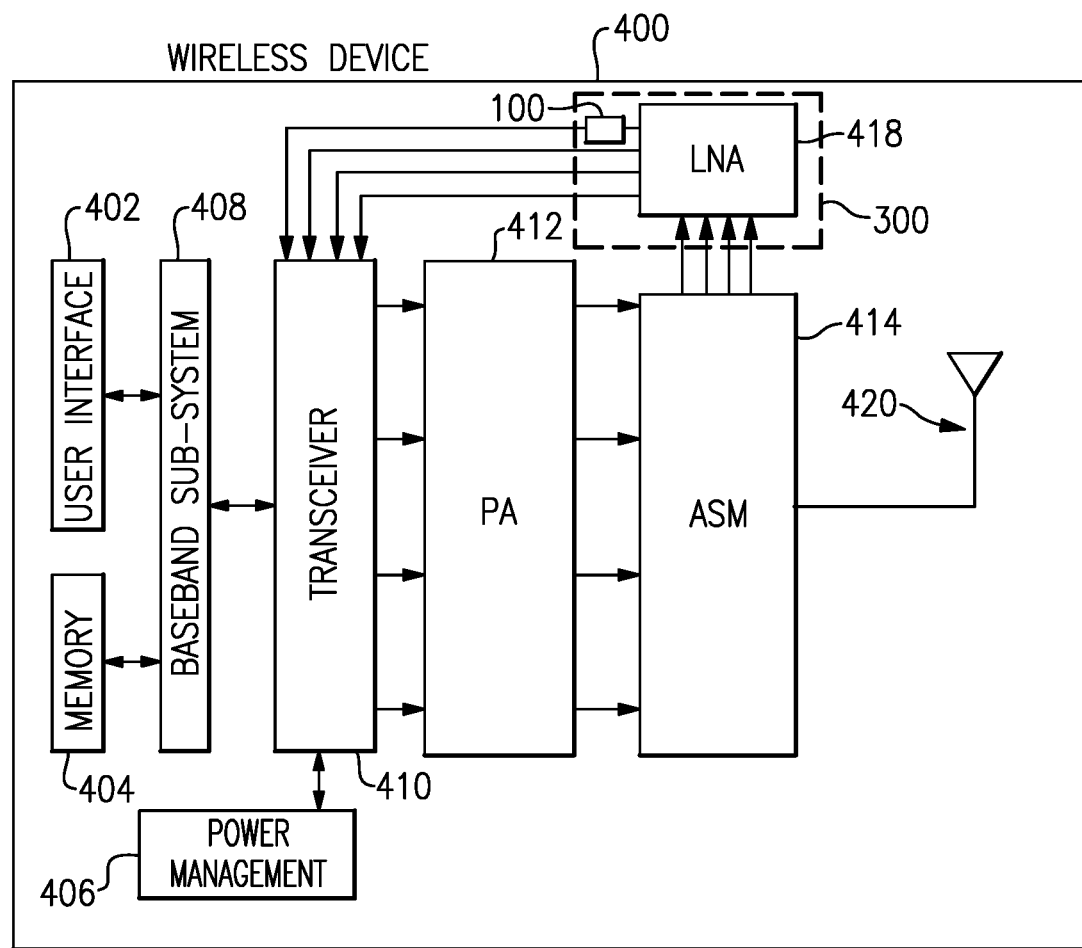
FIG. 27 shows a block diagram of an example wireless device, in accordance with some embodiments of the present disclosure.

FIG. 27 depicts an example wireless device 400 having one or more advantageous features described herein. In some embodiments, such advantageous features can be implemented in a front-end (FE) module or an LNA module 300. In some embodiments, such a module can include more or less components than as indicated by the dashed box.

PAs in a PA module 412 can receive their respective RF signals from a transceiver 410 that can be configured and operated to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 is also shown to be connected to a power management component 406 that is configured to manage power for the operation of the wireless device 400. Such power management can also control operations of the baseband sub-system 408 and other components of the wireless device 400.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, the module 300 can include a multiplexer 100 configured to provide one or more functionalities as described herein. Such a multiplexer can facilitate processing of signals received through an antenna 420 and an antenna switch module (ASM) 414. Amplified and multiplexed signals from the multiplexer 100 are shown to be routed to the transceiver 410.

Figure 28:
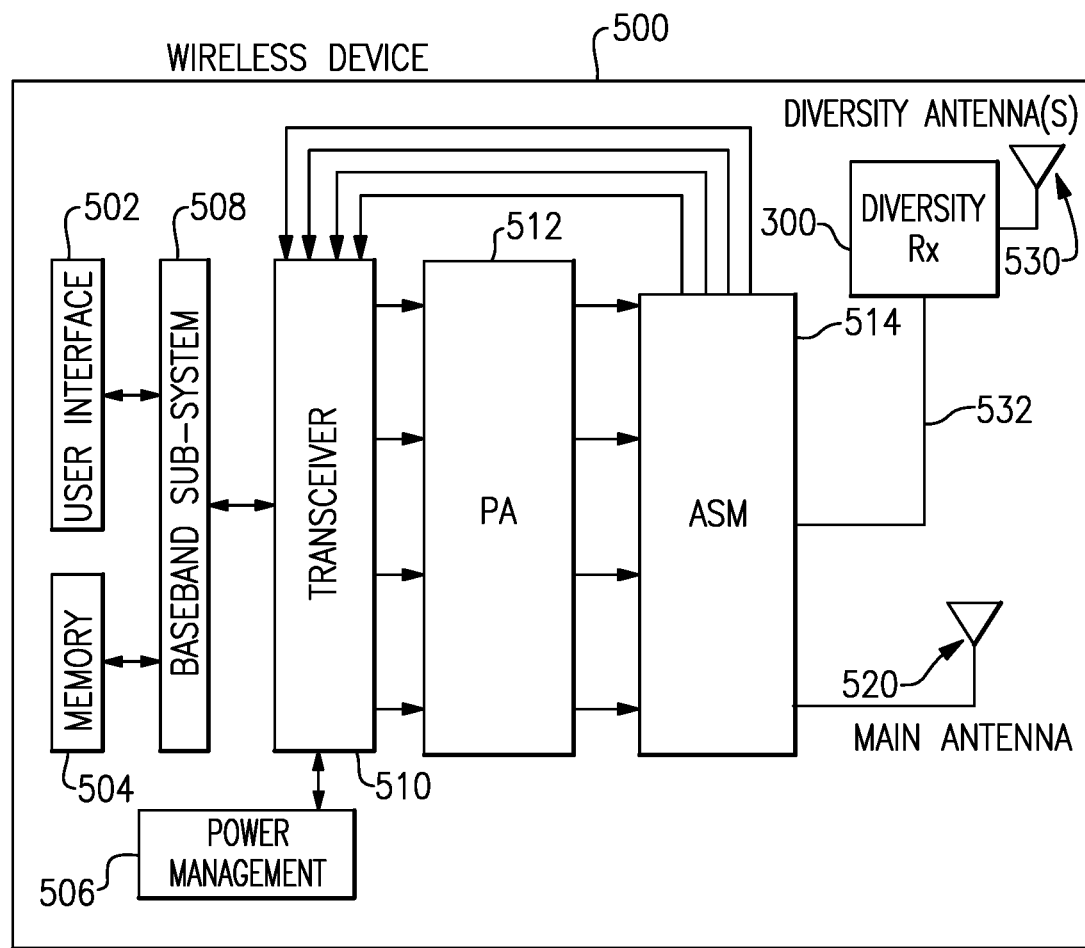
FIG. 28 shows a block diagram of an example wireless device, in accordance with some embodiments of the present disclosure.

FIG. 28 shows another example of a wireless device 500 in which one or more features of the present disclosure can be implemented in a diversity receive (DRx) module 300. In such a wireless device, components such as user interface 502, memory 504, power management 506, baseband sub-system 508, transceiver 510, power amplifier (PA) 512, antenna switch module (ASM) 514, and antenna 520 can be generally similar to the examples of FIG. 27.

In some embodiments, the DRx module 300 can be implemented between one or more diversity antennas and the ASM 514. Such a configuration can allow an RF signal received through the diversity antenna 530 to be processed (in some embodiments, including amplification by an LNA) with little or no loss of and/or little or no addition of noise to the RF signal from the diversity antenna 530. Such processed signal from the DRx module 300 can then be routed to the ASM through one or more signal paths 532 which can be relatively lossy.

In the example of FIG. 28, the RF signal from the DRx module 300 can be routed through the ASM 514 to the transceiver 510 through one or more receive (Rx) paths. Some or all of such Rx paths can include their respective LNA(s). In some embodiments, the RF signal from the DRx module 300 may or may not be further amplified with such LNA(s).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 4. It will be understood that at least some of the bands can be divided into sub-bands. It will also be understood that one or more features of the present disclosure can be implemented with frequency ranges that do not have designations such as the examples of Table 4.

TABLE 4

| Band | Mode | Tx Frequency Range (MHz) | Rx Frequency Range (MHz) |
| --- | --- | --- | --- |
| B1  | FDD | 1,920-1,980 | 2,110-2,170 |
| B2  | FDD | 1,850-1,910 | 1,930-1,990 |
| B3  | FDD | 1,710-1,785 | 1,805-1,880 |
| B4  | FDD | 1,710-1,755 | 2,110-2,155 |
| B5  | FDD | 824-849 | 869-894 |
| B6  | FDD | 830-840 | 875-885 |
| B7  | FDD | 2,500-2,570 | 2,620-2,690 |
| B8  | FDD | 880-915 | 925-960 |
| B9  | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

In various examples described herein, circuit elements such as capacitance, inductance and resistance can be utilized. It will be understood that such circuit elements can be implemented as a devices such as capacitors, inductors and resistors. Such devices can be implemented as discrete devices and/or distributed devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A multiplexer for processing of radio-frequency (RF) signals, the multiplexer comprising:
a common path configured to receive a plurality of radio-frequency signals;
a first path having an output coupled to the common path and configured to provide a band-pass response for a first frequency band BX; and
a second path having an output coupled to the common path such that radio-frequency signals in the first and second paths are combined and routed through the common path, the second path configured to provide a band-stop response for the first frequency band BX such that the common path includes a wideband response that includes the first frequency band BX and one or more other frequency bands, the second path including a resonant circuit configured to provide the band-stop response, the resonant circuit including an LC resonant circuit or a SAW (surface acoustic wave) resonant circuit.

2. The multiplexer of claim 1 wherein the first path includes a band-pass filter configured to provide the band-pass response.

3. The multiplexer of claim 1 wherein the resonant circuit includes the LC resonant circuit.

4. The multiplexer of claim 1 wherein the resonant circuit includes the SAW resonant circuit.

5. The multiplexer of claim 1 wherein the multiplexer is a diplexer.

6. The multiplexer of claim 1 further comprising a third path having an output coupled to the common path such that a radio-frequency signal in the third path is combined with the radio-frequency signals in the first and second paths and routed through the common path, the third path configured to provide a band-pass response for a second frequency band BY.

7. The multiplexer of claim 6 wherein the multiplexer is a triplexer.

8. The multiplexer of claim 6 wherein the second frequency band BY is covered by the wideband response of the common path.

9. The multiplexer of claim 8 wherein the third path includes a band-pass filter configured to provide the band-pass response for the second frequency band BY.

10. The multiplexer of claim 6 wherein the resonant circuit includes the LC resonant circuit.

11. The multiplexer of claim 10 wherein the LC resonant circuit is configured to provide a plurality of stop-band responses.

12. The multiplexer of claim 11 wherein the LC resonant circuit includes one or more switchable capacitances.

13. The multiplexer of claim 6 wherein the resonant circuit includes the SAW resonant circuit.

14. The multiplexer of claim 13 wherein the SAW resonant circuit includes a first and second SAW elements arranged in series, the first SAW element configured to provide the stop-band response for the first frequency band BX, and the second SAW element configured to provide the stop-band response for the second frequency band BY.

15. A radio-frequency module comprising:
a packaging substrate configured to receive a plurality of components; and
a multiplexer implemented on or within the packaging substrate, the multiplexer including a common path configured to receive a plurality of radio-frequency signals, the multiplexer further including a first path having an output coupled to the common path and configured to provide a band-pass response for a first frequency band BX, the multiplexer further including a second path having an output coupled to the common path such that radio-frequency signals in the first and second paths are combined and routed through the common path, the second path configured to provide a band-stop response for the first frequency band BX such that the common path includes a wideband response that includes the first frequency band BX and one or more other frequency bands, the second path including a resonant circuit configured to provide the band-stop response, the resonant circuit including an LC resonant circuit or a SAW (surface acoustic wave) resonant circuit.

16. The radio-frequency module of claim 15 wherein the first path includes a band-pass filter configured to provide the band-pass response.

17. The radio-frequency module of claim 15 wherein the resonant circuit includes the LC resonant circuit.

18. The radio-frequency module of claim 15 wherein the resonant circuit includes the SAW resonant circuit.

19. The radio-frequency module of claim 15 wherein the multiplexer is a diplexer.

20. The radio-frequency module of claim 15 wherein the multiplexer includes a third path having an output coupled to the common path such that a radio-frequency signal in the third path is combined with the radio-frequency signals in the first and second paths and routed through the common path, the third path configured to provide a band-pass response for a second frequency band BY.

* * * * *